United States Patent
Horikawa et al.

(10) Patent No.: US 8,987,347 B2
(45) Date of Patent: *Mar. 24, 2015

(54) COPOLYMER OF CONJUGATED DIENE COMPOUND AND NON-CONJUGATED OLEFIN, RUBBER COMPOSITION, RUBBER COMPOSITION FOR TIRE TREAD, CROSSLINKED RUBBER COMPOSITION, AND TIRE

(75) Inventors: Yasuo Horikawa, Kodaira (JP); Shojiro Kaita, Tokyo (JP); Olivier Tardif, Tokyo (JP); Junko Matsushita, Tachikawa (JP)

(73) Assignee: Bridgestone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/983,404

(22) PCT Filed: Feb. 1, 2012

(86) PCT No.: PCT/JP2012/000690
§ 371 (c)(1),
(2), (4) Date: Sep. 16, 2013

(87) PCT Pub. No.: WO2012/105258
PCT Pub. Date: Aug. 9, 2012

(65) Prior Publication Data
US 2014/0005296 A1  Jan. 2, 2014

(30) Foreign Application Priority Data

Feb. 4, 2011 (JP) ................. 2011-023406
Mar. 1, 2011 (JP) ................. 2011-044515

(51) Int. Cl.
C08J 5/14 (2006.01)
C08F 236/00 (2006.01)
C08F 236/06 (2006.01)
B60C 1/00 (2006.01)
C08F 236/04 (2006.01)
C08L 15/00 (2006.01)
C08K 3/04 (2006.01)
C08L 9/00 (2006.01)
C08L 23/16 (2006.01)

(52) U.S. Cl.
CPC ............ *C08F 236/06* (2013.01); *B60C 1/0016* (2013.01); *C08F 236/04* (2013.01); *C08L 15/00* (2013.01); *C08K 3/04* (2013.01); *C08L 9/00* (2013.01); *C08L 23/16* (2013.01)
USPC .......................... 523/155; 526/339

(58) Field of Classification Search
USPC ........................................ 523/155
See application file for complete search history.

(56) References Cited

U.S. PATENT DOCUMENTS 8,729,184 B2 *   5/2014  Matsushita et al. ........... 524/847
2010/0190940 A1  7/2010  Nakagawa et al.
2011/0136995 A1  6/2011  Nakagawa et al.

FOREIGN PATENT DOCUMENTS

| CN | 101796084 A | 8/2010 |
| JP | 8-259733 A | 10/1996 |
| JP | 9-291121 A | 11/1997 |
| JP | 11-228743 A | 8/1999 |
| JP | 2000-86857 A | 3/2000 |
| JP | 2000-154210 A | 6/2000 |
| JP | 2000-154279 A | 6/2000 |
| JP | 2006-503141 A | 1/2006 |
| JP | 2006-249442 A | 9/2006 |
| JP | 2008-280384 A | 11/2008 |
| JP | 2008280384 A * | 11/2008 |
| JP | 2008-291096 A | 12/2008 |
| WO | 2008/146643 A1 | 12/2008 |
| WO | 2009/148140 A1 | 12/2009 |
| WO | 2011/016210 A1 | 2/2011 |
| WO | 2012/014457 A1 | 2/2012 |

OTHER PUBLICATIONS

Translation of JP 2008-280384, Nov. 2008.*
Communication dated Oct. 14, 2014, issued by the Japanese Patent Office in counterpart Japanese application No. 2011-023406.
Communication dated Oct. 14, 2014, issued by the Japanese Patent Office in counterpart Japanese application No. 201 1-044515.
Communication dated Dec. 1, 2014, issued by the Korean Intellectual Property Office in counterpart Korean application No. 10-2013-7023052.
Office Action dated Oct. 20, 2014, issued by the State Intellectual Property Office of the People's Republic of China in counterpart Chinese Application No. 201280016623.7.

* cited by examiner

*Primary Examiner* — Hui Chin
(74) *Attorney, Agent, or Firm* — Sughrue Mion, PLLC

(57) ABSTRACT

The present invention provides a copolymer of a conjugated diene compound and a non-conjugated olefin that is used for manufacturing a rubber excellent in crack growth resistance, heat resistance and ozone resistance and that includes a cis-1,4 bond at a unit derived from the conjugated diene compound, a rubber composition containing the copolymer, a rubber composition for tire treads using the rubber composition for tire tread members, a crosslinked rubber composition obtained by crosslinking the rubber composition, and a tire using the rubber composition or the crosslinked rubber composition. In the copolymer of a conjugated diene compound and a non-conjugated olefin, the cis-1,4 bond content of a unit derived from the conjugated diene compound is more than 92%.

22 Claims, No Drawings

COPOLYMER OF CONJUGATED DIENE COMPOUND AND NON-CONJUGATED OLEFIN, RUBBER COMPOSITION, RUBBER COMPOSITION FOR TIRE TREAD, CROSSLINKED RUBBER COMPOSITION, AND TIRE

CROSS REFERENCE TO RELATED APPLICATIONS

This application is a National Stage of International Application No. PCT/JP2012/000690, filed on Feb. 1, 2011, which claims priority from Japanese Patent Application Nos. 2011-023406, filed on Feb. 4, 2011 and 2011-044515, filed Mar. 1, 2011, the contents of all of which are incorporated herein by reference in their entirety.

TECHNICAL FIELD

The present invention relates to a copolymer of a conjugated diene compound and a non-conjugated olefin (a conjugated diene compound/non-conjugated olefin copolymer), a rubber composition, a rubber composition for tire treads, a crosslinked rubber composition and a tire, and in particular, to a copolymer of a conjugated diene compound and a non-conjugated olefin that is used for manufacturing a rubber excellent in crack growth resistance, heat resistance and ozone resistance as well as wear resistance and that includes a cis-1,4 bond at a unit derived from the conjugated diene compound (a conjugated diene unit), a rubber composition containing the copolymer, a rubber composition for tire treads using the rubber composition for tire tread members, a crosslinked rubber composition obtained by crosslinking the rubber composition, and a tire using the rubber composition or the crosslinked rubber composition.

BACKGROUND ART

It is well known that coordination anionic polymerization using catalyst systems represented by a Ziegler-Natta catalyst allows for homopolymerization of olefins and dienes. However, it was difficult to provide efficient copolymerization of olefins and dienes using such polymerization systems.

To overcome this difficulty, for example, JP 2000-154210 A (PTL 1) discloses a catalyst for polymerizing conjugated dienes that contains a transition metal compound of group IV of the periodic table having cyclopentadiene ring structure, and also refers to an α-olefin such as ethylene as an exemplary monomer copolymerizable with this conjugated diene. However, PTL 1 does not provide a specific description of copolymerization of a conjugated diene compound and a non-conjugated olefin. Obviously, there is no description or suggestion of manufacturing a rubber excellent in crack growth resistance, heat resistance and ozone resistance by controlling the cis content and cis-1,4 bond content to be greater than 92%.

For example, JP 2006-249442 A (PTL 2) discloses a catalyst for polymerizing olefins that consists of a transition metal compound such as a titanium compound and a co-catalyst, and also discloses a copolymer of an α-olefin and a conjugated diene compound. However, specific manufacture and use were ensured only if the α-olefin, a non-conjugated olefin, is contained in an amount of 66.7 mol % to 99.1 mol %. That is, there is no description or suggestion in PTL 2 of manufacturing a rubber excellent in crack growth resistance, heat resistance and ozone resistance by controlling the cis content and cis-1,4 bond content to be greater than 92%.

In addition, JP 2006-503141 A (PTL 3) discloses a copolymer of ethylene and butadiene that is obtained by synthesizing ethylene and butadiene as a starting material by means of a special organic metal complex as a catalytic component. However, PTL 3 states that butadiene, a monomer, is inserted into the copolymer in the form of transformer-1,2-cyclohexane, and the structure disclosed in PTL 3 is different from that of the copolymer of the present invention. In addition, specific manufacture and use were ensured only if the ethylene, a non-conjugated olefin, is contained in an amount of 69.6 mol % to 89.0 mol %. In this case, the ethylene content was determined by 100 mol % minus the molar content of those units derived from butadiene with a known molar content. That is, there is no description or suggestion in PTL 3 of manufacturing a rubber excellent in crack growth resistance, heat resistance and ozone resistance by controlling the cis content and cis-1,4 bond content to be less than 92%.

In addition, JP 2000-086857 A (PTL 4) discloses a butadiene polymer having cis content of 92%, vinyl content of 6% and ethylene content of 3% or 9%. However, there is no description or suggestion in PTL 4 of manufacturing a rubber excellent in crack growth resistance, heat resistance and ozone resistance by controlling the cis content and cis-1,4 bond content to be greater than 92%.

In addition, JP 2000-154279 (PTL 5) discloses a rubber composition including: a butadiene-ethylene block copolymer having a cis content of 92% and ethylene segments in an amount of 4.8 mass % of the total; polybutadiene having a cis content of 95.2% and a vinyl content of 2.5%; and carbon black N220. However, there is no description or suggestion in PTL 5 that a rubber excellent in crack growth resistance, heat resistance and ozone resistance can be obtained by controlling the cis content and cis-1,4 bond content to be greater than 92%.

Further, JP 11-228743 A (PTL 6) discloses an unsaturated elastomer composition that is composed of an unsaturated olefin-based copolymer (an olefin-rich, olefin-diene copolymer) and rubber. However, there is no description or suggestion in PTL 6 of the cis content and vinyl content of the olefin-diene copolymer, even of manufacture of a rubber excellent in crack growth resistance, heat resistance and ozone resistance by controlling the cis content and cis-1,4 bond content to be greater than 92%.

Additionally, in response to increasing social demands for energy and resource saving, there is an increasing need for a rubber material that is excellent in wear resistance and crack growth resistance to meet the requirements for improving durability of tires in order to reduce fuel consumption of automobiles. In addition, in view of the recent surge in price of butadiene, it is expected that the price of raw materials will even more dramatically rise in the future. As such, there is a need to make use of inexpensive olefin resource even in tire materials.

To address this issue, attempts have been made conventionally to combine high cis-butadiene rubber with natural rubber. There is a problem, however, in that sufficient wear resistance cannot be obtained by combining these rubbers due to incompatibility between them.

In addition, the characteristics required when a rubber composition containing a copolymer of a conjugated diene and a non-conjugated olefin is applied to various applications (such as tires, conveyor belts and anti-vibration rubber) include good wear resistance and crack growth resistance.

For example, PTL 1-6 disclose the aforementioned techniques, but fail to teach or suggest that a rubber which is excellent in wear resistance and crack growth resistance may be obtained by mixing a conjugated diene-based polymer with a conjugated diene compound/non-conjugated olefin copolymer in which the cis-1,4 bond content of a unit derived from the conjugated diene compound is more than 92%.

CITATION LIST

Patent Literature

PTL 1: JP 2000-154210 A
PTL 2: JP 2006-249442 A
PTL 3: JP 2006-503141 A
PTL 4: JP 2000-086857 A
PTL 5: JP 2000-154279 A
PTL 6: JP 11-228743 A

SUMMARY OF INVENTION

Technical Problem

Under such circumstances, an object of the present invention is to provide a copolymer of a conjugated diene compound and a non-conjugated olefin that is used for manufacturing a rubber excellent in crack growth resistance, heat resistance and ozone resistance as well as wear resistance, that includes a cis-1,4 bond at a unit derived from the conjugated diene compound (conjugated diene unit), and that the cis-1,4 bond content of the unit derived from the conjugated diene compound (conjugated diene unit) is more than 92%, a rubber composition containing the copolymer, a rubber composition for tire treads using the rubber composition for tire tread members, a crosslinked rubber composition obtained by crosslinking the rubber composition, and a tire using the rubber composition or the crosslinked rubber composition.

Solution to Problem

The inventors of the present invention have made intensive studies to achieve the above-described object and found that a conjugated diene compound/non-conjugated olefin copolymer which is obtained by polymerizing a conjugated diene compound and a non-conjugated olefin in the presence of a specific catalyst involves a unit derived from the conjugated diene compound (conjugated diene unit) having a cis-1,4 bond content of more than 92%. The present invention has been completed based on this finding.

In the copolymer of a conjugated diene compound and a non-conjugated olefin according to the present invention, the cis-1,4 bond content of a unit derived from the conjugated diene compound is more than 92%.

As used herein, the term "cis-1,4 bond content" means the proportion of 1,4-cis bonds in the conjugated diene units in the unit derived from the conjugated diene compound.

In this copolymer, the content of the unit derived from the non-conjugated olefin is more preferably 50 mol % or less.

In addition, the content of 1,2 adduct units (including 3,4 adduct units) of the conjugated diene compound in the unit derived from the conjugated diene compound is preferably 5% or less.

Besides, the copolymer preferably has a molecular weight distribution (Mw/Mn) of 10 or less.

In addition, the non-conjugated olefin may preferably be an acyclic olefin, more preferably have 2 to 10 carbon atoms, even more preferably be at least one selected from the group consisting of ethylene, propylene and 1-butene, and most preferably be ethylene.

In addition, the conjugated diene compound preferably has 4 to 8 carbon atoms, and more preferably is at least one selected from a group consisting of 1,3-butadiene and isoprene.

A rubber composition according to the present invention includes the copolymer of the present invention.

Preferably, the rubber composition according to the present invention further includes a conjugated diene-based polymer.

Preferably, the rubber composition of the present invention further includes carbon black, which has a nitrogen adsorption specific surface area ($N_2SA$) of more than 50 $m^2/g$.

The rubber composition of the present invention preferably contains the carbon black by 10 parts by mass to 70 parts by mass per 100 parts by mass of the rubber component.

In the rubber composition of the present invention, the conjugated diene-based polymer is preferably natural rubber.

In the rubber composition of the present invention, the content of the natural rubber per 100 parts by mass of the rubber component is preferably at least 10 parts by mass.

In the rubber composition of the present invention, a mass ratio of the copolymer of a conjugated diene compound and a non-conjugated olefin to the conjugated diene-based polymer is preferably 10/90 to 90/10.

Preferably, the rubber composition of the present invention further includes a crosslinking agent by 0.1 parts by mass to 20 parts by mass per 100 parts by mass of the rubber component.

A rubber composition for tire treads according to the present invention uses the rubber composition of the present invention for tire tread members.

A crosslinked rubber composition according to the present invention is obtained by crosslinking the rubber composition of the present invention.

A tire according to the present invention is manufactured by using the rubber composition of the present invention or the crosslinked rubber composition of the present invention.

The tire according to the present invention uses the rubber composition of the present invention or the crosslinked rubber composition of the present invention for tread members.

Advantageous Effect of Invention

With the copolymer of a conjugated diene compound and a non-conjugated olefin according to the present invention, such a rubber may be manufactured that is excellent in crack growth resistance, heat resistance and ozone resistance by controlling the cis-1,4 bond content of the unit derived from the conjugated diene compound to be more than 92%.

In addition, a rubber which is excellent in wear resistance and crack growth resistance may be manufactured by mixing a conjugated diene-based polymer with a conjugated diene compound/non-conjugated olefin copolymer in which the cis-1,4 bond content of a unit derived from the conjugated diene compound is more than 92%.

DESCRIPTION OF EMBODIMENTS

The present invention will be described in detail below.

The copolymer of a conjugated diene compound and a non-conjugated olefin according to the present invention preferably includes a non-conjugated olefin as a monomer unit component in the copolymer.

Applying a copolymer of a conjugated diene and a non-conjugated olefin to the compounded rubber results in fewer double bonds in the unit derived from the conjugated diene compound (the conjugated diene unit) in the copolymer as compared with conjugated polymers, and therefore, improved ozone resistance.

In the copolymer of a conjugated diene compound and a non-conjugated olefin according to the present invention, the cis-1,4 bond content of the unit derived from the conjugated diene compound (conjugated diene unit) is more than 92%, preferably 95% or more, and more preferably 97% or more.

The cis-1,4 bond content of the unit derived from the conjugated diene compound (conjugated diene unit) may be controlled to be more than 92% for improved crack growth resistance, weather resistance and heat resistance.

The unit derived from the conjugated diene compound having a cis 1,4 bond content of 92% or less may have lower durability (such as fracture resistant properties and crack growth resistance) and may not exhibit extended crystallinity.

The cis-1,4 bond content of the unit derived from the conjugated diene compound (conjugated diene unit) may be controlled to be preferably 95% or more, more preferably 97% or more, in terms of crack growth resistance, weather resistance and heat resistance.

The unit derived from the conjugated diene compound having a cis 1,4 bond content in a more preferred range is advantageous in durability (such as fracture resistant properties and crack growth resistance) and extended crystallinity.

The cis-1,4 bond content corresponds to an amount in the unit derived from the conjugated diene compound, rather than the ratio to the entire copolymer.

The chain structure of the conjugated diene compound/non-conjugated olefin copolymer is not particularly limited and may be selected appropriately depending on the intended use, examples of which include block-, random- and tapered-type.

The content of 1,2 adduct units (including 3,4 adduct units) of the conjugated diene compound in the unit derived from the conjugated diene compound of the conjugated diene compound/non-conjugated olefin copolymer is not particularly limited, and may be selected appropriately depending on the intended use, preferably 5% or less and more preferably 3% or less.

If the content of 1,2 adduct units (including 3,4 adduct units) of the conjugated diene compound in the unit derived from the conjugated diene compound of the conjugated diene compound/non-conjugated olefin copolymer is more than 5%, the resulting conjugated diene compound/non-conjugated olefin copolymer and conjugated diene-based polymer, which will be described later, may have less extended crystallinity and crack growth resistance as well as reduced weather resistance due to formation of radicals.

On the other hand, if the content of 1,2 adduct units (including 3,4 adduct units) of the conjugated diene compound in the unit derived from the conjugated diene compound of the conjugated diene compound/non-conjugated olefin copolymer is in a more preferred range, this is advantageous in crack growth resistance and weather resistance.

The content of 1,2 adduct units (including 3,4 adduct units) corresponds to an amount contained in the unit derived from the conjugated diene compound, rather than the ratio to the entire copolymer.

Here, the content of 1,2 adduct units (including 3,4 adduct units) of the conjugated diene compound in the unit derived from the conjugated diene compound is equal to a 1,2-vinyl bond content when the conjugated diene compound is butadiene.

The non-conjugated olefin used as a monomer is a non-conjugated olefin other than a conjugated diene compound, and the degree of freedom in designing it as an elastomer may be improved by means of its excellent heat resistance, by reducing the proportion of double bonds in the main chain of the copolymer, and by controlling its crystallinity.

The content of the unit derived from the non-conjugated olefin in the conjugated diene compound/non-conjugated olefin copolymer is not particularly limited and may be selected appropriately depending on the intended use, preferably 50 mol % or less, more preferably 40 mol % or less, and particularly preferably less than 10 mol %.

If the content of the unit derived from non-conjugated olefin in the conjugated diene compound/non-conjugated olefin copolymer is more than 50 mol %, this may pose challenges in kneading performance with a filler and workability, and may lead to deterioration in compatibility with the conjugated diene-based polymer as described later, resulting in a reduction in weather resistance and crack growth resistance.

On the other hand, if the content of the unit derived from the non-conjugated olefin in the conjugated diene compound/non-conjugated olefin copolymer is in the above-described more preferred range, this is advantageous in terms of workability.

The content of the unit derived from the conjugated diene compound in the conjugated diene compound/non-conjugated olefin copolymer is not particularly limited, and may be selected as appropriate depending on the application thereof. This content is preferably 50 mol % or more, and more preferably 60 mol % or more.

If the content of the unit derived from the conjugated diene compound in the conjugated diene compound/non-conjugated olefin copolymer is less than 50 mol %, the resulting copolymer may behave more like a plastic and present poor properties as an elastomer, leading to insufficient crack resistance, less compatibility with the conjugated diene-based polymer as described later, and lower crack growth resistance.

On the other hand, if the content of the unit derived from the conjugated diene compound in the conjugated diene compound/non-conjugated olefin copolymer is in the above-described more preferred range, the resulting copolymer is advantageous in terms of workability and fatigue resistance.

The non-conjugated olefin is preferably an acyclic olefin, and is preferably an α-olefin having 2 to 10 carbon atoms. An a-olefin has a double bond at the α position of an olefin, and therefor allows efficient copolymerization with a conjugated diene. Therefore, preferred examples of the non-conjugated olefin include α-olefins, such as ethylene, propylene, 1-butene, 1-pentene, 1-hexene, 1-heptene, and 1-octene. Among these, more preferred are ethylene, propylene and 1-butene, and even more preferred is ethylene. These non-conjugated olefins may be used alone or in combination of two or more. As used herein, olefin refers to unsaturated aliphatic hydrocarbon, which is a compound containing at least one carbon-carbon double covalent bond.

The conjugated diene compound preferably has 4 to 12 carbon atoms, and preferably has 4 to 8 carbon atoms. Specific examples of this conjugated diene compound include 1,3-butadiene, isoprene, 1,3-pentadiene, 2,3-dimethylbutadiene, and so on; among these, preferred are 1,3-butadiene and isoprene. In addition, these conjugated diene compounds may be used alone or in a combination of two or more.

Any of the aforementioned specific examples of the conjugated diene compound can be used for preparing the copolymer of the present invention in the same mechanism.

In addition, since the copolymer of the present invention exhibits static crystallinity when containing a block sequence composed of monomeric units of the non-conjugated olefin, it may indicate the excellent mechanical properties, such as breaking strength. The block sequence includes a multiblock sequence. A block copolymer including a plurality of structures of (X-Y) or of (Y-X) is referred to as multiblock sequence (where X denotes a block sequence including monomer units of a non-conjugated olefin, and Y denotes a block sequence including monomer units of a conjugated diene compound).

The copolymer of the present invention is free of a problem of molecular weight reduction, and the weight-average molecular weight (Mw) thereof is not particularly limited. However, in view of the application to polymer materials, a polystyrene-equivalent weight-average molecular weight (Mw) of the copolymer is preferably 10,000 to 10,000,000, more preferably 10,000 to 1,000,000, and even more preferably 50,000 to 600,000. Mw exceeding 10,000,000 may deteriorate formability and workability.

Further, this copolymer preferably has a molecular weight distribution (Mw/Mn) of 10 or less, more preferably 6 or less, and particularly preferably 5 or less, which is represented by a ratio of weight average molecular weight (Mw) to number average molecular weight (Mn). This is because a molecular weight distribution exceeding 10 leads to nonhomogeneous physical properties.

It should be noted here that the average molecular weight and the molecular weight distribution may be determined by gel permeation chromatography (GPC) using polystyrene as the standard.

Preferably, the copolymer of a conjugated diene compound and a non-conjugated olefin according to the present invention does not contain an arrangement of successive non-conjugated olefins.

Next, a method capable of manufacturing the copolymer of the present invention will be described in detail below. However, the manufacturing method described in detail below is merely an example.

The copolymer of the present invention allows for polymerization of a conjugated diene compound and a non-conjugated olefin in the presence of the following polymerization catalyst or polymerization catalyst composition (polymerization step). It should be noted that any polymerization method may be used, including solution polymerization, suspension polymerization, liquid phase bulk polymerization, emulsion polymerization, gas phase polymerization, solid phase polymerization, and so on. In addition, in the case of using a solvent for polymerization reaction, any solvent may be used that is inert to the polymerization reaction, including, for example, toluene, cyclohexane, n-hexane and mixtures thereof.

The above-described manufacturing method allows copolymerization of monomers, i.e., a conjugated diene compound and a non-conjugated olefin, as is the case with a normal method of manufacturing polymers by means of coordinated ionic polymerization catalysts, except that the above polymerization catalyst or polymerization catalyst composition is used.

<First Polymerization Catalyst Composition>
An example of the aforementioned polymerization catalyst composition includes a polymerization catalyst composition (hereinafter, also referred to as a "first polymerization catalyst composition") including at least one complex selected from the group consisting of: a metallocene complex represented by the following general formula (I); a metallocene complex represented by the following general formula (II); and a half metallocene cation complex represented by the following general formula (III):

(In the formula (I), M represents a lanthanoid element, scandium, or yttrium; $Cp^R$ each independently represents an unsubstituted or substituted indenyl group; $R^a$ to $R^f$ each independently represent a hydrogen atom or an alkyl group having 1 to 3 carbon atoms; L represents a neutral Lewis base; and w represents an integer of 0 to 3.);

(In the formula (II), M represents a lanthanoid element, scandium, or yttrium; $Cp^R$ each independently represents an unsubstituted or substituted indenyl group; X' represents a hydrogen atom, a halogen atom, an alkoxide group, a thiolate group, an amide group, a silyl group, or a hydrocarbon group having 1 to 20 carbon atoms; L represents a neutral Lewis base; and w represents an integer of 0 to 3.); and

(In the formula (III), M represents a lanthanoid element, scandium, or yttrium; $Cp^{R'}$ each independently represents an unsubstituted or substituted cyclopentadienyl, indenyl, fluorenyl group; X represents a hydrogen atom, a halogen atom, an alkoxide group, a thiolate group, an amide group, a silyl group, or a hydrocarbon group having 1 to 20 carbon atoms; L represents a neutral Lewis base; w represents an integer of 0 to 3; and $[B]^-$ represents a non-coordinating anion.). The first polymerization catalyst composition may further include another component such as a co-catalyst, which is contained in a general polymerization catalyst composition containing a metallocene complex. As used herein, the metallocene complex is a complex compound having one or more cyclopentadienyl groups or derivative of cyclopentadienyl groups bonded to the central metal. In particular, a metallocene complex may be referred to as a "half metallocene complex" when the number of cyclopentadienyl group or derivative thereof bonded to the central metal is one. In the polymerization system, the concentration of the complex contained in the first polymerization catalyst composition is preferably defined to fall within a range of 0.1 mol/L to 0.0001 mol/L.

In the metallocene complex represented by the general formulae (I) and (II) above, $Cp^R$ in the formulae represents an unsubstituted or substituted indenyl group. $Cp^R$ having an indenyl ring as a basic skeleton may be represented by $C_9H_{7-X}R_X$ or $C_9H_{11-X}R_X$. Here, X represents an integer of 0 to 7 or 0 to 11. Further, R each independently preferably represents a hydrocarbyl group or a metalloid group. The hydrocarbyl group preferably has 1 to 20 carbon atoms, more preferably 1 to 10 carbon atoms, and even more preferably 1 to 8 carbon atoms. Preferred specific examples of the hydrocarbyl group include a methyl group, an ethyl group, a phenyl group, and a benzyl group. Examples of metalloid in the metalloid group include germyl (Ge), stannyl (Sn), and silyl (Si). In addition, the metalloid group preferably has a hydrocarbyl group which is similar to the hydrocarbyl group described above. Specific examples of the metalloid group include a trimethylsilyl group. Specific examples of the substituted indenyl group include 2-phenyl indenyl and 2-methyl indenyl group. Two $Cp^R$ in the general formulae (I) and (II) may be the same as or different from each other.

In the half metallocene cation complex represented by the general formula (III), $Cp^{R'}$ in the formula represents a substituted or unsubstituted cyclopentadienyl, indenyl, or fluorenyl group, with the substituted or unsubstituted indenyl group being preferred. $Cp^{R'}$ having a cyclopentadienyl ring as a basic skeleton is represented by $C_5H_{5-X}R_X$. Here, X represents an integer of 0 to 5. Further, R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a phenyl group, and a benzyl group. Examples of metalloid in the metalloid group include germyl (Ge), stannyl (Sn), and silyl (Si). In addition, the metalloid group preferably has a hydrocarbyl group which is similar to the hydrocarbyl group described above. Specific examples of the metalloid group include a trimethylsilyl group. $Cp^{R'}$ having a cyclopentadienyl ring as a basic skeleton is specifically exemplified as follows.

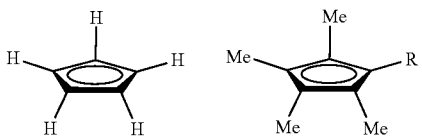

(In the formula, R represents a hydrogen atom, a methyl group, or an ethyl group.)

In the general formula (III), $Cp^{R'}$ having an indenyl ring as a basic skeleton is defined as the same as $Cp^R$ in the general formula (I), and preferred examples thereof are also the same as those of $Cp^R$ in the general formula (I).

In the general formula (III), $Cp^{R'}$ having the fluorenyl ring above as a basic skeleton may be represented by $C_{13}H_{9-X}R_X$ or $C_{13}H_{17-X}R_X$. Here, X represents an integer of 0 to 9 or 0 to 17. Further, R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a phenyl group, and a benzyl group. Examples of metalloid in the metalloid group include germyl (Ge), stannyl (Sn), and silyl (Si). In addition, the metalloid group preferably has a hydrocarbyl group which is similar to the hydrocarbyl group described above. A specific example of the metalloid group includes a trimethylsilyl group.

The central metal represented by M in the general formulae (I), (II), and (III) represents a lanthanoid element, scandium, or yttrium. The lanthanoid elements include 15 elements with atomic numbers 57 to 71, and may be any one of them. Preferred examples of the central metal represented by M include samarium (Sm), neodymium (Nd), praseodymium (Pr), gadolinium (Gd), cerium (Ce), holmium (Ho), scandium (Sc), and yttrium (Y).

The metallocene complex represented by the general formula (I) includes a silyl amide ligand represented by [—N(SiR$_3$)$_2$]. Groups represented by R ($R^a$ to $R^f$ in the general formula (I)) in the silyl amide ligand each independently represent a hydrogen atom or an alkyl group having 1 to 3 carbon atoms, and it is preferred that at least one of $R^a$ to $R^f$ represents a hydrogen atom. With at least one of $R^a$ to $R^f$ representing a hydrogen atom, the catalyst can be synthesized with ease, and the bulkiness around silicon can be reduced, to thereby allow the non-conjugated olefin to be easily introduced. Based on the same objective, it is further preferred that at least one of $R^a$ to $R^c$ represents a hydrogen atom, and at least one of $R^d$ to $R^f$ represents a hydrogen atom. Additionally, a methyl group is preferred as the alkyl group.

The metallocene complex represented by the general formula (II) includes a silyl ligand represented by [—SiX'$_3$]. X' in the silyl ligand represented by [—SiX'$_3$] is a group defined as the same as X in the general formula (III) described below, and preferred examples thereof are also the same as those of X in the general formula (III).

In the general formula (III), X represents a group selected from the group consisting of a hydrogen atom, a halogen atom, an alkoxide group, a thiolate group, an amide group, a silyl group, and a hydrocarbon group having 1 to 20 carbon atoms. In the general formula (III), the alkoxide group represented by X may be any one of aliphatic alkoxy groups such as a methoxy group, an ethoxy group, a propoxy group, an n-butoxy group, an isobutoxy group, a sec-butoxy group, and a tert-butoxy group; and aryl oxide groups (aromatic alkoxy groups) such as a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, and a 2-isopropyl-6-neopentylphenoxy group. Among these, preferred is the 2,6-di-tert-butylphenoxy group.

In the general formula (III), the thiolate group represented by X may be any one of: aliphatic thiolate groups such as a thiomethoxy group, a thioethoxy group, a thiopropoxy group, a thio-n-butoxy group, a thioisobutoxy group, a thio-sec-butoxy group, and a thio-tert-butoxy group; and aryl thiolate groups such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, and a 2,4,6-triisopropylthiophenoxy group. Among these, preferred is the 2,4,6-triisopropylthiophenoxy group.

In the general formula (III), the amide group represented by X may be any one of: aliphatic amide groups such as a dimethyl amide group, a diethyl amide group, and a diisopropyl amide group; arylamide groups such as a phenyl amide group, a 2,6-di-tert-butylphenyl amide group, a 2,6-diisopropylphenyl amide group, a 2,6-dineopentylphenyl amide group, a 2-tert-butyl-6-isopropylphenyl amide group, a 2-tert-butyl-6-neopentylphenyl amide group, a 2-isopropyl-6-neopentylphenyl amide group, and a 2,4,6-tri-tert-butylphenyl amide group; and bistrialkylsilyl amide groups such as a bistrimethylsilyl amide group. Among these, preferred is the bistrimethylsilyl amide group.

In the general formula (III), the silyl group represented by X may be any one of a trimethylsilyl group, a tris(trimethylsilyl)silyl group, a bis(trimethylsilyl)methylsilyl group, a trimethylsilyl(dimethyl)silyl group, and a triisopropylsilyl(bistrimethylsilyl)silyl group. Among these, preferred is the tris(trimethylsilyl)silyl group.

In the general formula (III), the halogen atom represented by X may be any one of a fluorine atom, a chlorine atom, a bromine atom, and an iodine atom; among these, preferred are the chlorine atom and the iodine atom. Specific examples of the hydrocarbon group having 1 to 20 carbon atoms represented by X include: linear or branched aliphatic hydrocarbon groups such as a methyl group, an ethyl group, an n-propyl group, an isopropyl group, an n-butyl group, an isobutyl group, a sec-butyl group, a tert-butyl group, a neopentyl group, a hexyl group, and an octyl group; aromatic hydrocarbon groups such as a phenyl group, a tolyl group, and a naphthyl group; aralkyl groups such as a benzyl group; and hydrocarbon groups such as a trimethylsilylmethyl group and a bistrimethylsilylmethyl group each containing a silicon atom. Among these, preferred are the methyl group, the ethyl group, the isobutyl group, the trimethylsilylmethyl group, and the like.

In the general formula (III), the bistrimethylsilyl amide group or the hydrocarbon group having 1 to 20 carbon atoms is preferred as X.

In the general formula (III), examples of the non-coordinating anion represented by [B]⁻ include tetravalent boron anions. Specific examples of the tetravalent boron anion include tetraphenyl borate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra(tolyl)borate, tetra(xylyl)borate, (tripheyl, pentafluorophenyl)borate, [tris(pentafluorophenyl), phenyl]borate, and tridecahydride-7,8-dicarbaundecaborate. Among these, preferred is the tetrakis(pentafluorophenyl)borate.

The metallocene complexes represented by the general formulae (I) and (II) and the half metallocene cation complex represented by the general formula (III) may include 0 to 3, preferably 0 or 1 neutral Lewis bases represented by L. Examples of the neutral Lewis base L include tetrahydrofuran, diethyl ether, dimethylaniline, trimethylphosphine, lithium chloride, neutral olefins, and neutral diolefins. When a plurality of neutral Lewis bases represented by L are incorporated, respective L may be the same as or different from each other.

The metallocene complexes represented by the general formulae (I) to (II), and the half metallocene cation complex represented by the general formula (III) may be each present as a monomer, a dimer or a higher-order multimer.

The metallocene complex represented by the general formula (I) can be obtained by, for example, subjecting a lanthanoid trishalide, a scandium trishalide, or a yttrium trishalide to reaction in a solvent with a salt of indenyl (for example, a potassium salt or a lithium salt) and a salt of bis(trialkylsilyl) amide (for example, a potassium salt or a lithium salt). The reaction temperature only needs to be set to about room temperature, and thus the complex can be manufactured in mild conditions. In addition, reaction time is arbitrary, but about several hours to several tens of hours. Although not particularly limited, a reaction solvent is preferably such a solvent that dissolves the raw material and products. For example, toluene may be used. In the following, a reaction example for obtaining the metallocene complex represented by the general formula (I) is described.

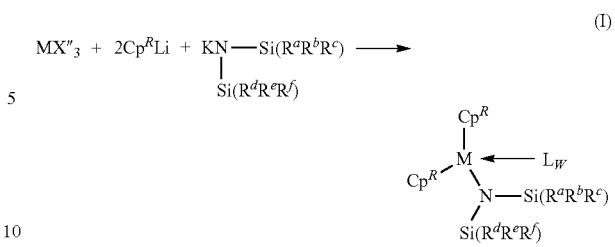

(In the Formula, X″ represents a halide.)

The metallocene complex represented by the general formula (II) can be obtained by, for example, subjecting a lanthanoid trishalide, a scandium trishalide, or a yttrium trishalide to reaction in a solvent with a salt of indenyl (for example, a potassium salt or a lithium salt) and a salt of silyl (for example, a potassium salt or a lithium salt). The reaction temperature only needs to be set to about room temperature, and thus the complex can be manufactured in mild conditions. In addition, reaction time is arbitrary, but about several hours to several tens of hours. A reaction solvent is not particularly limited, with a solvent that dissolves the raw material and products being preferred, and for example, toluene may be used. In the following, a reaction example for obtaining the metallocene complex represented by the general formula (II) is described.

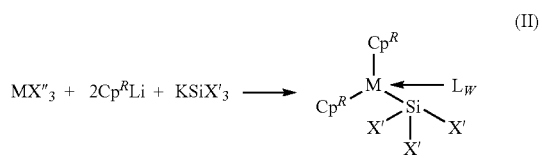

(In the Formula, X″ represents a halide.)

The half metallocene cation complex represented by the general formula (III) can be obtained by, for example, the following reaction:

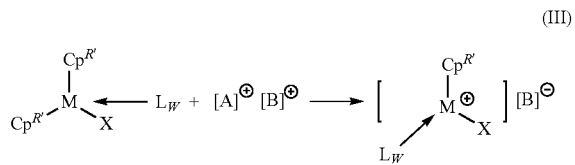

In the general formula (IV) representing a compound: M represents a lanthanoid element, scandium, or yttrium; $Cp^{R'}$ independently represents an unsubstituted or substituted cyclopentadienyl, indenyl, or fluorenyl; X represents a hydrogen atom, a halogen atom, an alkoxide group, a thiolate group, an amide group, a silyl group, or a hydrocarbon group having 1 to 20 carbon atoms; L represents a neutral Lewis base; and w represents an integer of 0 to 3. Further, in the general formula [A]⁺[B]⁻ representing an ionic compound, [A]⁺ represents a cation; and [B]⁻ represents a non-coordinating anion.

Examples of the cation represented by [A]⁺ include a carbonium cation, an oxonium cation, an amine cation, a phosphonium cation, a cycloheptatrienyl cation, and a ferrocenium cation containing a transition metal. Examples of the carbonium cation include trisubstituted carbonium cations such as a triphenylcarbonium cation and a tri(substituted phenyl)carbonium cation. Specific examples of the tri(substituted phenyl)carbonium cation include a tri(methylphenyl) carbonium cation. Examples of the amine cation include: trialkylammonium cations such as a trimethylammonium cation, a triethylammonium cation, a tripropylammonium cation, and a tributylammonium cation; N,N-dialkylanilinium cations such as a N,N-dimethylanilinium cation, a N,N-diethylanilinium cation, and a N,N-2,4,6-pentamethylanilinium cation; and dialkylammonium cations such as a diisopropylammonium cation and a dicyclohexylammonium cation. Examples of the phosphonium cation include triarylphosphonium cations such as a triphenylphosphonium cation, a tri(methylphenyl)phosphonium cation, and a tri(dimethylphenyl)phosphonium cation. Of these cations, the N,N-dialkylanilinium cations or the carbonium cations are preferred, and the N,N-dialkylanilinium cations are particularly preferred.

In the general formula $[A]^+[B]^-$ representing the ionic compound to be used in the above reaction is a compound obtained by combining any one selected from the non-coordinating anions described above and any one selected from the cations described above. Preferred examples thereof include N,N-dimethylanilinium tetrakis(pentafluorophenyl) borate and triphenylcarbonium tetrakis(pentafluorophenyl) borate. The ionic compound represented by the general formula $[A]^+[B]^-$ is added in an amount of preferably 0.1-fold mol to 10-fold mol and more preferably about 1-fold mol, with respect to the metallocene complex. When the half metallocene cation complex represented by the general formula (III) is used in polymerization reaction, the half metallocene cation complex represented by the general formula (III) may be directly supplied to the polymerization system, or alternatively, the compound represented by the general formula (IV) used in the above reaction and the ionic compound represented by the general formula $[A]^+[B]^-$ may be separately supplied to the polymerization system, to thereby form the half metallocene cation complex represented by the general formula (III) in the reaction system. In addition, the half metallocene cation complex represented by the general formula (III) may be formed in the reaction system by using the metallocene complex represented by the general formula (I) or (II) and the ionic compound represented by the general formula $[A]^+[B]^-$ in combination.

Structures of the metallocene complex represented by the general formula (I) or (II) and of the half metallocene cation complex represented by the general formula (III) is preferably determined by X-ray crystallography.

The co-catalyst that can be contained in the first polymerization catalyst composition may be arbitrarily selected from components used as the co-catalyst for the general polymerization catalyst composition containing a general metallocene complex. Preferred examples of the co-catalyst include aluminoxanes, organic aluminum compounds, and the above ionic compounds. These co-catalysts may be contained alone or in combination of two or more.

The aluminoxane is preferably an alkyl aluminoxane, examples of which include methyl aluminoxane (MAO) and modified methyl aluminoxane. In addition, preferred examples of the modified methyl aluminoxane include MMAO-3A (manufactured by Tosoh Finechem Corporation). The content of the aluminoxane in the first polymerization catalyst composition is preferably about 10 to 1,000, more preferably about 100, at an element ratio (Al/M) of the aluminum element Al of the aluminoxane to the central metal element M in the metallocene complex.

On the other hand, a preferred example of the organic aluminum compounds may include an organic aluminum compound represented by a general formula AlRR'R" (where R and R' each independently represent a hydrocarbon group of $C_1$ to $C_{10}$ or a hydrogen atom, and R" is a hydrocarbon group of $C_1$ to $C_{10}$). Examples of the organic aluminum compound include a trialkyl aluminum, a dialkyl aluminum chloride, an alkyl aluminum dichloride, and a dialkyl aluminum hydride; among these, preferred is the trialkyl aluminum. In addition, examples of the trialkyl aluminum include triethyl aluminum and triisobutyl aluminum. The content of the organic aluminum compound in the first polymerization catalyst composition is preferably 2-fold mol to 50-fold mol and more preferably about 10-fold mol, with respect to the metallocene complex.

In the first polymerization catalyst composition, the metallocene complex represented by the general formulae (I) and (II) and the half metallocene cation complex represented by the general formula (III) may be combined with an appropriate co-catalyst, to thereby increase the cis-1,4 bond content and the molecular weight of a copolymer to be obtained.

<Second Polymerization Catalyst Composition>

Another preferred example of the aforementioned polymerization catalyst composition may include:

a polymerization catalyst composition (hereinafter, also referred to as a "second polymerization catalyst composition") containing:

component (A): a rare earth element compound or a reactant of a rare earth element compound and a Lewis base, with no bond formed between the rare earth element and carbon;

component (B): at least one selected from the group consisting of: an ionic compound (B-1) composed of a non-coordinating anion and a cation; an aluminoxane (B-2); and at least one kind of halogen compound (B-3) from among a Lewis acid, a complex compound of a metal halide and a Lewis base, and an organic compound containing active halogen. Further, if the second polymerization catalyst composition contains at least one kind of the ionic compound (B-1) and the halogen compound (B-3), the polymerization catalyst composition further contains:

component (C): an organic metal compound represented by the following general formula (X):

$YR^1_a R^2_b R^3_c$ (X)

(where Y is a metal selected from Group 1, Group 2, Group 12, and Group 13 of the periodic table; $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above, with a being 1 and b and c both being 0 when Y is a metal selected from Group 1 of the periodic table, a and b being 1 and c being 0 when Y is a metal selected from Group 2 and Group 12 of the periodic table, a, b, and c are all 1 when Y is a metal selected from Group 13 of the periodic table).

The above-described second polymerization catalyst composition used in the method of manufacturing the copolymer is required to contain the above-described components (A) and (B), and if the polymerization catalyst composition contains at least one of the above-described ionic compound (B-1) and halogen compound (B-3), then it is further required to contain an organometallic compound represented by the following formula: component (C) represented by the following general formula (X):

$YR^1_a R^2_b R^3_c$ (X)

(where Y is a metal selected from Group 1, Group 2, Group 12, and Group 13 of the periodic table; $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above, a being 1 and b and c both being 0 when Y is a metal selected from Group 1 of the periodic table, a and b being 1 and c being 0 when Y is a metal selected from Group 2 and Group 12 of the periodic table, a, b, and c are all 1 when Y is a metal selected from Group 13 of the periodic table). The ionic compound (B-1) and the halogen compound (B-3) do not have carbon atoms to be fed to the component (A), and thus the component (C) becomes necessary as a source of feeding carbon to the component (A). Here, the polymerization catalyst composition still may include the component (C) even if the polymerization catalyst composition includes the aluminoxane (B-2). Further, the second polymerization catalyst composition may further include another component such as a co-catalyst, which is contained in a general rare earth element compound-based polymerization catalyst composition. In the polymerization system, the concentration of the component (A) contained in the second polymerization catalyst composition is preferably defined to fall within a range of 0.1 mol/L to 0.0001 mol/L.

The component (A) contained in the second polymerization catalyst composition is a rare earth element compound or a reactant of the rare earth element compound and a Lewis base. Here, a rare earth element compound or a reactant of the rare earth element compound and a Lewis base do not have a direct bond of the rare earth element and carbon. When the rare earth element compound or a reactant thereof does not have a direct bond of a rare earth element and carbon, the resulting compound is stable and easy to handle. As used herein, the rare earth element compound refers to a compound containing a lanthanoid element, scandium, or yttrium. The lanthanoid elements include elements with atomic numbers 57 to 71 of the periodic table. Specific examples of the lanthanoid element include lanthanum, cerium, praseodymium, neodymium, promethium, samarium, europium, gadolinium, terbium, dysprosium, holmium, erbio, tulio, itterbio, and lutezio. These components (A) may be contained alone or in combination of two or more.

The rare earth element compound is preferably composed of a rare earth metal of a bivalent or trivalent salt or of a complex compound, and further preferably a rare earth element compound containing at least one ligand selected from a hydrogen atom, a halogen atom, and an organic compound residue. Further, the rare earth element compound or the reactant of the rare earth element compound and the Lewis base is represented by the following general formula (XI) or (XII):

$$M^{11}X^{11}{}_2 \cdot L^{11}{}_w \quad (XI)$$

$$M^{11}X^{11}{}_3 \cdot L^{11}{}_w \quad (XII)$$

(where: $M^{11}$ represents a lanthanoid element, scandium, or yttrium; $X^{11}$ each independently represent a hydrogen atom, a halogen atom, an alkoxy group, a thiolate group, an amide group, a silyl group, an aldehyde residue, a ketone residue, a carboxylic acid residue, a thiocarboxylic acid residue, or a phosphorous compound residue; $L^{11}$ represents a Lewis base; and w represents 0 to 3).

Specific examples of a group (ligand) to form a bond to the rare earth element of the rare earth element compound include: a hydrogen atom; aliphatic alkoxy groups such as a methoxy group, an ethoxy group, a propoxy group, an n-butoxy group, an isobutoxy group, a sec-butoxy group, and a tert-butoxy group; aromatic alkoxy groups such as a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, and a 2-isopropyl-6-neopentylphenoxy group; aliphatic thiolate groups such as thiomethoxy group, a thioethoxy group, a thiopropoxy group, a thio-n-butoxy group, a thioisobutoxy group, a thio-sec-butoxy group, and a thio-tert-butoxy group; aryl thiolate groups such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, and a 2,4,6-triisopropylthiophenoxy group; aliphatic amide groups such as a dimethyl amide group, a diethyl amide group, a diisopropyl amide group; arylamide groups such as a phenyl amide group, a 2,6-di-tert-butylphenyl amide group, a 2,6-diisopropylphenyl amide group, a 2,6-dineopentylphenyl amide group, a 2-tert-butyl-6-isopropylphenyl amide group, a 2-tert-butyl-6-neopentylphenyl amide group, a 2-isopropyl-6-neopentylphenyl amide group, and a 2,4,6-tert-butylphenyl amide group; bistrialkylsilyl amide groups such as a bistrimethylsilyl amide group; silyl groups such as a trimethylsilyl group, a tris(trimethylsilyl)silyl group, a bis(trimethylsilyl)methylsilyl group, a trimethylsilyl(dimethyl)silyl group, and a triisopropylsilyl(bistrimethylsilyl)silyl group; halogen atoms such as a fluorine atom, a chlorine atom, a bromine atom, and an iodine atom. Other examples may include: residues of aldehyde such as salicylaldehyde, 2-hydroxy-1-naphthaldehyde, and 2-hydroxy-3-naphthaldehyde; residues of hydroxyphenone such as 2'-hydroxyacetophenone, 2'-hydroxybutyrophenone, and 2'-hydroxypropiophenone; residues of diketone such as acetylacetone, benzoylacetone, propionylaceton, isobutyl acetone, valerylacetone, and ethylacetylacetone; residues of an carboxylic acid such as an isovaleric acid, a caprylic acid, an octanoic acid, a lauric acid, a myristic acid, a palmitic acid, a stearic acid, an isostearic acid, an oleic acid, a linoleic acid, a cyclopentanecarboxylic acid, a naphthenic acid, an ethylhexanoic acid, a pivalic acid, a versatic acid (trade name of a product manufactured by Shell Chemicals Japan Ltd., a synthetic acid composed of a mixture of C10 monocarboxylic acid isomers), a phenylacetic acid, a benzoic acid, 2-naphthoate acid, a maleic acid, and a succinic acid; residues of thicarboxylic acid such as a hexanethioic acid, 2,2-dimethylbutanethioic acid, a decanethioic acid, and a thiobenzoic acid; residues of phosphoric acid ester such as a phosphoric acid dibutyl, a phosphoric acid dipentyl, a phosphoric acid dihexyl, a phosphoric acid diheptyl, a phosphoric acid dioctyl, phosphoric acid bis(2-ethylhexyl), a phosphoric acid bis(1-methylheptyl), a phosphoric acid dilauryl, a phosphoric acid dioleyl, a phosphoric acid diphenyl, a phosphoric acid bis(p-nonylphenyl), a phosphoric acid bis(polyethylene glycol-p-nonylphenyl), a phosphoric acid (butyl)(2-ethylhexyl), a phosphoric acid(1-methylheptyl)(2-ethylhexyl), and a phosphoric acid(2-ethylhexyl)(p-nonylphenyl); residues of phosphonic acid ester such as a 2-ethylhexyl phosphonic acid monobutyl, a 2-ethylhexyl phosphonic acid mono-2-ethylhexyl, a phenylphosphonic acid mono-2-ethylhexyl, a 2-ethylhexyl phosphonic acid mono-p-nonylphenyl, a phosphonic acid mono-2-ethylhexyl, a phosphonic acid mono-1-methylheptyl, and a phosphonic acid mono-p-nonylphenyl; residues of phosphinic acid such as a dibutylphosphinic acid, a bis(2-ethylhexyl)phosphinic acid, a bis(1-methylheptyl)phosphinic acid, a dilauryl phosphinic acid, a dioleyl phosphinic acid, a diphenyl phosphinic acid, a bis(p-nonylphenyl)phosphinic acid, a butyl(2-ethylhexyl) phosphinic acid, (2-ethylhexyl)(1-methylheptyl)phosphinic acid, an (2-ethylhexyl)(p-nonylphenyl) phosphinic acid, a butyl phosphinic acid, 2-ethylhexyl phosphinic acid, a 1-methylheptyl phosphinic acid, an oleyl phosphinic acid, a lauryl phosphinic acid, a phenyl phosphinic acid, and a p-nonylphenyl phosphinic acid. These ligands may be used alone or in combination of two or more. Of those, amide groups, which easily form active species through reaction with co-catalyst, are preferred.

As to the component (A) used in the second polymerization catalyst composition, examples of the Lewis base to react with the rare earth element compound may include: tetrahydrofuran; diethyl ether; dimethylaniline; trimethylphosphine; lithium chloride, neutral olefins, and neutral diolefins. Here, in the case where the rare earth element compound reacts with a plurality of Lewis bases (in the case where w is 2 or 3 in Formulae (XI) and (XII)), the Lewis base $L^{11}$ in each formula may be the same as or different from each other.

The component (B) contained in the second polymerization catalyst composition is at least one compound selected from the group consisting of: an ionic compound (B-1); an aluminoxane (B-2); and a halogen compound (B-3). The total content of the component (B) contained in the second polymerization catalyst composition is preferably defined to fall within a range of 0.1-fold mol to 50-fold mol, with respect to the component (A).

The ionic compound represented by (B-1) is formed of non-coordinating anion and cation, and an example thereof includes: an ionic compound that reacts with the rare earth element compound as the component (A) or with the reactant resulting from Lewis base and the rare earth element compound, so as to form a cationic transition metal compound. Here, examples of the non-coordinating anion include: tetraphenyl borate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra(tolyl) borate, tetra(xylyl)borate, (tripheyl, pentafluorophenyl) borate, [tris(pentafluorophenyl), phenyl]borate, and tridecahydride-7,8-dicarbaundecaborate. Meanwhile, examples of the cation may include a carbonium cation, an oxonium cation, an ammonium cation, a phosphonium cation, a cycloheptatrienyl cation, and a ferrocenium cation containing a transition metal. Specific examples of the carbonium cation include trisubstituted carbonium cations such as a triphenylcarbonium cation and a tri(substituted phenyl)carbonium cation, and more specific examples of the tri(substituted phenyl)carbonium cation include a tri(methylphenyl) carbonium cation and a tri(dimethylphenyl)carbonium cation. Examples of the ammonium cation include: trialkylammonium cations such as a trimethylammonium cation, a triethylammonium cation, a tripropylammonium cation, and a tributylammonium cation (such as a tri(n-butyl)ammonium cation); N,N-dialkylanilinium cations such as a N,N-dimethylanilinium cation, N,N-diethylanilinium cation, and a N,N-2,4,6-pentamethylanilinium cation; and dialkylammonium cations such as a diisopropylammonium cation and a dicyclohexylammonium cation. Specific examples of the phosphonium cation include triarylphosphonium cations such as a triphenylphosphonium cation, a tri(methylphenyl) phosphonium cation, and a tri(dimethylphenyl)phosphonium cation. Therefore, the ionic compound may preferably be a compound obtained by combining any one selected from the non-coordinating anions described above and any one selected from the cations described above. Specific examples thereof preferably include a N,N-dimethylanilinium tetrakis(pentafluorophenyl)borate and a triphenylcarbonium tetrakis(pentafluorophenyl)borate. These ionic compounds may be contained alone or in combination of two or more. The content of the ionic compound in the second polymerization catalyst composition is preferably 0.1-fold mol to 10-fold mol, and more preferably about 1-fold mol, with respect to the component (A).

The aluminoxane represented by (B-2) is a compound obtained by contacting an organic aluminum compound with a condensation agent, and examples thereof include: a chain type aluminoxane or a cyclic aluminoxane, both having a repeating unit represented by the general formula (—Al(R') O—) (where R' is a hydrocarbon group having 1 to 10 carbon atoms and may be partly substituted with halogen atom and/ or alkoxy group, and the polymerization degree of the repeating unit is preferably at least 5, more preferably at least 10). Here, specific examples of R' include a methyl group, an ethyl group, a propyl group, and isobutyl group, with the methyl group being preferred. Further, examples of the organic aluminum compound used as a raw material of the aluminoxane may include: trialkyl aluminums such as trimethyl aluminum, triethyl aluminum, triisobutyl aluminum and the like; and mixtures thereof, with the trimethyl aluminum being particularly preferred. For example, an aluminoxane obtained using, as a raw material, a mixture of trimethyl aluminum and tributyl aluminum can be suitably used. The content of aluminoxane in the second polymerization catalyst composition is preferably about 10 to 1,000 at an element ratio (Al/M) of the aluminum element Al of the aluminoxane to the rare earth element M forming the component (A).

The halogen compound represented by (B-3) includes at least one of: a Lewis acid; a complex compound of a metal halide and a Lewis base; and an organic compound containing active halogen, and is capable of reacting with, for example, the rare earth element compound as the component (A) or with the reactant resulting from Lewis base and the rare earth element compound, so as to form a compound, such as a cationic transition metal compound, a halogenated transition metal compound or a compound with a charge-deficient transition metal center. The content of the halogen compound in the second polymerization catalyst composition is preferably 1-fold mol to 5-fold mol, with respect to the component (A).

Examples of the Lewis acid may include: a boron-containing halogen compound such as $B(C_6F_5)_3$ and an aluminum-containing halogen compound such as $Al(C_6F_5)_3$, and may also include a halogen compound containing an element of Group III, Group IV, Group V, Group VI, and Group VIII of the periodic table. Preferred examples thereof include an aluminum halide or an organometallic halide. Preferred examples of the halogen element include chlorine and bromine. Specific examples of the Lewis acid include: a methyl aluminum dibromide; a methyl aluminum dichloride; an ethyl aluminum dibromide; an ethyl aluminum dichloride; a butyl aluminum dibromide; a butyl aluminum dichloride; a dimethyl aluminum bromide; a dimethyl aluminum chloride; a diethyl aluminum bromide; a diethyl aluminum chloride; a dibutyl aluminum bromide; a dibutyl aluminum chloride; a methyl aluminum sesquibromide; a methyl aluminum sesquichloride; a ethyl aluminum sesquibromide; an ethyl aluminum sesquichloride; a dibutyltin dichloride; an aluminum tribromide; an antimony trichloride; an antimony pentachloride; a phosphorus trichloride; a phosphorus pentachloride; a tin tetrachloride; a titanium tetrachloride; and tungsten hexachloride. Among these, particularly preferred are the diethyl aluminum chloride, the ethyl aluminum sesquichloride, the ethyl aluminum dichloride, the diethyl aluminum bromide, the ethyl aluminum sesquibromide, and the ethyl aluminum dibromide.

Preferred examples of the metal halide forming a complex compound of the metal halide and a Lewis base include: a beryllium chloride, a beryllium bromide; a beryllium iodide; a magnesium chloride; a magnesium bromide; a magnesium iodide; a calcium chloride; a calcium bromide; a calcium iodide; a barium chloride; a barium bromide; a barium iodide; a zinc chloride; a zinc bromide; a zinc iodide; a cadmium chloride; a cadmium bromide; a cadmium iodide; a mercury chloride; a mercury bromide; a mercury iodide; a manganese chloride; a manganese bromide; a manganese iodide; a rhenium chloride; a rhenium bromide; a rhenium iodide; a copper chloride; a copper iodide; a silver chloride; a silver bromide; a silver iodide; a gold chloride; a gold iodide; and a gold bromide. Among these, particularly preferred are the magnesium chloride, the calcium chloride, the barium chloride, the manganese chloride, the zinc chloride, and the copper chloride being preferred, and the magnesium chloride, the manganese chloride, the zinc chloride, and the copper chloride.

Preferred examples of the Lewis base forming a complex compound of the metal halide and the Lewis base include: a phosphorus compound; a carbonyl compound; a nitrogen compound; an ether compound; and an alcohol. Specific examples thereof include: a tributyl phosphate; a tri-2-ethylhexyl phosphate; a triphenyl phosphate; a tricresyl phosphate; a triethylphosphine; a tributylphosphine; a triphenylphosphine; a diethylphosphinoethane; a diphenylphosphinoethane; an acetylacetone; a benzoylacetone; a propionitrileacetone; a valerylacetone; an ethylacetylacetone; a methyl acetoacetate; an ethyl acetoacetate; a phenyl acetoacetate; a dimethyl malonate; a diethyl malonate; a diphenyl malonate; an acetic acid; an octanoic acid; a 2-ethylhexoic acid; an oleic acid; a stearic acid; a benzoic acid; a naphthenic acid; a versatic acid; a triethylamine; a N,N-dimethylacetamide; a tetrahydrofuran; a diphenyl ether; a 2-ethylhexyl alcohol; an oleyl alcohol; stearyl alcohol; a phenol; a benzyl alcohol; a 1-decanol; and a lauryl alcohol. Among these, preferred are the tri-2-ethylhexyl phosphate, the tricresyl phosphate; the acetylacetone, the 2-ethylhexoic acid, the versatic acid, the 2-ethylhexyl alcohol; the 1-decanol; and the lauryl alcohol.

The Lewis base is subjected to reaction with the metal halide in the proportion of 0.01 mol to 30 mol, preferably 0.5 mol to 10 mol, per 1 mol of the metal halide. The use of the reactant obtained from the reaction of the Lewis base can reduce residual metal in the polymer.

An example of the organic compound containing active halogen includes benzyl chloride.

The component (C) contained in the second polymerization catalyst composition is an organic metal compound represented by the general formula (X):

$$YR^1_aR^2_bR^3_c \quad (X)$$

(where Y is a metal selected from Group 1, Group 2, Group 12, and Group 13 of the periodic table; $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above, a being 1 and b and c both being 0 when Y is a metal selected from Group 1 of the periodic table, a and b being 1 and c being 0 when Y is a metal selected from Group 2 and Group 12 of the periodic table, a, b, and c are all 1 when Y is a metal selected from Group 13 of the periodic table), and is preferably an organic aluminum compound represented by the general formula (Xa):

$$AlR^1R^2R^3 \quad (Xa)$$

(where $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above). Examples of the organic aluminum compound in the formula (X) include: a trimethyl aluminum, a triethyl aluminum, a tri-n-propyl aluminum, a triisopropyl aluminum, a tri-n-butyl aluminum, a triisobutyl aluminum, a tri-t-butyl aluminum, a tripentyl aluminum, a trihexyl aluminum, a tricyclohexyl aluminum, a trioctyl aluminum; a diethylaluminum hydride, a di-n-propyl aluminum hydride, a di-n-butyl aluminum hydride, a diisobutyl aluminum hydride, a dihexyl aluminum hydride; a diisohexyl aluminum hydride, a dioctyl aluminum hydride, a diisooctyl aluminum hydride; an ethyl aluminum dihydride, a n-propyl aluminum dihydride, and an isobutyl aluminum dihydride. Among these, preferred are the triethyl aluminum, the triisobutyl aluminum, the diethyl aluminum hydride, and the diisobutyl aluminum hydride. The organic aluminum compounds as the component (C) may be contained alone or in combination of two or more. The content of the organic aluminum compound in the second polymerization catalyst composition is preferably 1-fold mol to 50-fold mol, and more preferably about 10-fold mol, with respect to the component (A).

<Polymerization Catalyst and Third Polymerization Catalyst Composition>

Examples of the polymerization catalyst include: a metallocene-based composite catalyst which is used for polymerization with the conjugated diene compound and the non-conjugated olefin and is represented by the following formula (A):

$$R_aMX_bQY_b \quad (A)$$

(where R each independently represents an unsubstituted or substituted indenyl group, the R being coordinated with M; M represents a lanthanoid element, scandium, or yttrium; X each independently represents a hydrocarbon group having 1 to 20 carbon atoms, the X being μ-coordinated with M and Q; Q represents a Group 13 element in the periodic table; Y each independently represents a hydrocarbon group having 1 to 20 carbon atoms or a hydrogen atom, the Y being coordinated with Q; and a and b each are 2).

Preferred examples of the above-described metallocene-based composite catalyst include a metallocene-based composite catalyst represented by the following formula (XV):

(where $M^1$ represents a lanthanoid element, scandium, or yttrium; $Cp^R$ each independently represents an unsubstituted or substituted indenyl group; $R^A$ to $R^B$ each independently represent a hydrocarbon group having 1 to 20 carbon atoms, $R^A$ and $R^B$ being μ-coordinated with $M^1$ and Al; and $R^C$ and $R^D$ each independently represent a hydrocarbon group having 1 to 20 carbon atoms or a hydrogen atom).

In addition, the above-described third polymerization catalyst composition contains the above-described metallocene-based composite catalyst and a boron anion.

<Metallocene-Based Composite Catalyst>

The above-described metallocene-based composite catalyst will now be described in detail below. The above-described metallocene-based composite catalyst has a rare earth element of lanthanoid element, scandium or yttrium and a group 13 element in the periodic table, and is represented by the following formula (A):

$$R_aMX_bQY_b \quad (A)$$

(where R each independently represents an unsubstituted or substituted indenyl group, the R being coordinated with M; M represents a lanthanoid element, scandium, or yttrium; X each independently represents a hydrocarbon group having 1 to 20 carbon atoms, the X being μ-coordinated with M and Q; Q represents a Group 13 element in the periodic table; Y each independently represents a hydrocarbon group having 1 to 20 carbon atoms or a hydrogen atom, the Y being coordinated with Q; and a and b each are 2). The above-described metallocene-based polymerization catalyst allows for manufacture of a copolymer of a conjugated diene compound and a non-conjugated olefin. In addition, the use of the above-described metallocene-based composite catalyst, such as the one combined with an aluminum-based catalyst, can reduce or eliminate the amount of alkyl aluminum to be used in the step of synthesizing a copolymer. Meanwhile, the use of a conventional catalyst system requires a large amount of alkyl aluminum to be used in synthesizing a copolymer. For example, a conventional catalyst system requires alkyl aluminum of at least 10 equivalents relative to a metal catalyst, whereas the above-described metallocene-based composite catalyst of the present invention can exhibit an excellent catalytic effect through the addition of alkyl aluminum of only about 5 equivalents.

In the metallocene-based composite catalyst, the metal represented by M in the formula (A) is a lanthanoid element, scandium, or yttrium. The lanthanoid elements include 15 elements with atomic numbers 57 to 71, and may be any one of them. Preferred examples of the metal represented by M include samarium (Sm), neodymium (Nd), praseodymium (Pr), gadolinium (Gd), cerium (Ce), holmium (Ho), scandium (Sc), and yttrium (Y).

In the formula (A), R each independently represents an unsubstituted or substituted indenyl, the R being coordinated with the metal M. Specific examples of the substituted indenyl group include a 1,2,3-trimethyl indenyl group, a heptamethyl indenyl group, and a 1,2,4,5,6,7-hexamethyl indenyl group.

In the formula (A), Q represents a Group 13 element in the periodic table. Specific examples thereof include: boron, aluminum, gallium, indium, and thallium.

In the formula (A), X each independently represents a hydrocarbon group having 1 to 20 carbon atoms, the X being μ-coordinated with M and Q. Here, examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group. The μ-coordination refers to a state of coordination which forms a crosslinked structure.

In the formula (A), Y each independently represents a hydrocarbon group having 1 to 20 carbon atoms or a hydrogen atom, the Y being coordinated with Q. Here, examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

In the formula (XV) above, the metal represented by $M^1$ is a lanthanoid element, scandium, or yttrium. The lanthanoid elements include 15 elements with atomic numbers 57 to 71, and may be any one of them. Preferred examples of the metal represented by $M^1$ include samarium (Sm), neodymium (Nd), praseodymium (Pr), gadolinium (Gd), cerium (Ce), holmium (Ho), scandium (Sc), and yttrium (Y).

In the formula (XV), $Cp^R$ represents an unsubstituted or substituted indenyl. $Cp^R$ having an indenyl ring as a basic skeleton may be represented by $C_9H_{7-X}R_X$ or $C_9H_{11-X}R_X$. Here, X represents an integer of 0 to 7 or 0 to 11. Further, R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a phenyl group, and a benzyl group. Examples of metalloid in the metalloid group include germyl (Ge), stannyl (Sn), and silyl (Si). In addition, the metalloid group preferably has a hydrocarbyl group which is similar to the hydrocarbyl group described above. A specific example of the metalloid group includes a trimethylsilyl group. Specific examples of the substituted indenyl group include 2-phenyl indenyl and 2-methyl indenyl group. Two $Cp^R$ in the formula (XV) may be the same as or different from each other.

In the formula (XV), $R^A$ and $R^B$ each independently represent a hydrocarbon group having 1 to 20 carbon atoms, the $R^A$ and $R^B$ being μ-coordinated with $M^1$ and Al. Here, examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group. The μ-coordination refers to a state of coordination which forms a crosslinked structure.

In the formula (XV), $R^C$ and $R^D$ each independently represent a hydrocarbon group having 1 to 20 carbon atoms or a hydrogen atom. Here, examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

The metallocene-based composite catalyst can be obtained by, for example, reacting with an organic aluminum compound represented by $AlR^KR^LR^M$ in a solvent, the metallocene complex represented by the following formula (XVI):

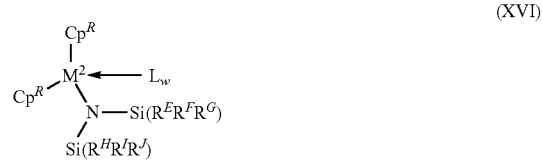

(where, $M^2$ represents a lanthanoid element, scandium, or yttrium; $Cp^R$ each independently represents an unsubstituted or substituted indenyl group; $R^E$ to $R^J$ each independently represent an alkyl group having 1 to 3 carbon atoms or a hydrogen atom; L represents a neutral Lewis base; and w represents an integer of 0 to 3.). The reaction temperature only needs to be set to about room temperature, and thus the complex can be manufactured in mild conditions. In addition, reaction time is arbitrary, but about several hours to several tens of hours. The reaction solvent is not particularly limited, and any solvent including, for example, toluene and hexane, which are capable of dissolving the raw material and products can be preferably used. The structure of the metallocene-based composite catalyst may preferably be determined by $^1$H-NMR or X-ray crystallography.

In the metallocene complex represented by the formula (XVI) above, $Cp^R$ is an unsubstituted indenyl or substituted indenyl and has the same meaning as $Cp^R$ in the formula (XV) above. In addition, in the formula (XVI) above, metal $M^2$ is a lanthanoid element, scandium or yttrium and has the same meaning as metal $M^1$ in the formula (XV) above.

The metallocene complex represented by the formula (XVI) above includes a silylamide ligand [—N(SiR$_3$)$_2$]. Each of R groups ($R^E$ to $R^J$ groups) included in the silylamide ligand is independently an alkyl group having 1 to 3 carbon atoms or a hydrogen atom. Also, at least one of $R^E$ to $R^J$ is preferably a hydrogen atom. If at least one of $R^E$ to $R^J$ is a hydrogen atom, it becomes easier to synthesize a catalyst. Additionally, a methyl group is preferred as the alkyl group.

The metallocene complex represented by the formula (XVI) above further contains 0 to 3, preferably 0 or 1 neutral Lewis bases represented by L. Examples of the neutral Lewis base L include tetrahydrofuran, diethyl ether, dimethylaniline, trimethylphosphine, lithium chloride, neutral olefins, and neutral diolefins. When a plurality of neutral Lewis bases represented by L are incorporated, respective L may be the same or different from each other.

In addition, the metallocene complex represented by the formula (XVI) may be present as a monomer, a dimer or a higher-order multimer.

On the other hand, the organic aluminum compound used for generating the above-described metallocene-based composite catalyst is represented by AlR$^K$R$^L$R$^M$, where R$^K$ and R$^L$ are independently a univalent hydrocarbon group having 1 to 20 carbon atoms or a hydrogen atom, and R$^M$ is a univalent hydrocarbon group having 1 to 20 carbon atoms, in which R$^M$ may be the same as or different from R$^K$ or R$^L$ above. Here, examples of the univalent hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

Specific examples of the organic aluminum compound include: a trimethyl aluminum, a triethyl aluminum, a tri-n-propyl aluminum, a triisopropyl aluminum, a tri-n-butyl aluminum, a triisobutyl aluminum, a tri-t-butyl aluminum, a tripentyl aluminum, a trihexyl aluminum, a tricyclohexyl aluminum, a trioctyl aluminum; a diethylaluminum hydride, a di-n-propyl aluminum hydride, a di-n-butyl aluminum hydride, a diisobutyl aluminum hydride, a dihexyl aluminum hydride; a diisohexyl aluminum hydride, a dioctyl aluminum hydride, a diisooctyl aluminum hydride; an ethyl aluminum dihydride, a n-propyl aluminum dihydride, and an isobutyl aluminum dihydride. Among these, preferred are the triethyl aluminum, the triisobutyl aluminum, the diethyl aluminum hydride, and the diisobutyl aluminum hydride. These organic aluminum compounds may be contained alone or in combination of two or more. The content of the organic aluminum compound to be used for generating the metallocene-based composite catalyst is preferably 1-fold mol to 50-fold mol, and more preferably about 10-fold mol, with respect to the metallocene complex.

<Third Polymerization Catalyst Composition>

Preferred examples of the polymerization catalyst composition include the above-described metallocene-based composite catalyst and boron anion. Furthermore, this polymerization catalyst composition preferably includes another component such as a co-catalyst, which is contained in a general polymerization catalyst composition containing a metallocene-based catalyst. Here, the third polymerization catalyst composition is also referred to two-component catalyst, which has the metallocene-based composite catalyst and boron anion. As is the case with the metallocene-based composite catalyst, the third polymerization catalyst composition further contains boron anion, which allows arbitrary control of the content of each monomer component in the copolymer.

In the third polymerization catalyst composition, a specific example of the boron anion forming the two-component catalyst includes a tetravalent boron anion. Examples thereof may include: a tetraphenyl borate, a tetrakis(monofluorophenyl) borate, a tetrakis(difluorophenyl)borate, a tetrakis(trifluorophenyl)borate, a tetrakis(tetrafluorophenyl)borate, a tetrakis(pentafluorophenyl)borate, a tetrakis(tetrafluoromethylphenyl)borate, a tetra(tolyl)borate, a tetra(xylyl)borate, a (tripheyl, pentafluorophenyl)borate, a [tris(pentafluorophenyl), phenyl]borate, and a tridecahydride-7,8-dicarbaundecaborate; among these, preferred is the tetrakis(pentafluorophenyl)borate.

The boron anion may be used as an ionic compound combined with cation. Examples of the cation include a carbonium cation, an oxonium cation, an amine cation, a phosphonium cation, a cycloheptatrienyl cation, and a ferrocenium cation containing a transition metal. Examples of the carbonium cation include trisubstituted carbonium cations such as a triphenylcarbonium cation and a tri(substituted phenyl)carbonium cation, and specific examples of the tri(substituted phenyl)carbonium cation include a tri(methylphenyl)carbonium cation. Examples of the amine cation include: trialkylammonium cations such as a trimethylammonium cation, a triethylammonium cation, a tripropylammonium cation, and a tributylammonium cation; N,N-dialkylanilinium cations such as a N,N-dimethylanilinium cation, N,N-diethylanilinium cation, and a N,N-2,4,6-pentamethylanilinium cation; and dialkylammonium cations such as a diisopropylammonium cation and a dicyclohexylammonium cation. Examples of the phosphonium cation include triarylphosphonium cations such as a triphenylphosphonium cation, a tri(methylphenyl)phosphonium cation, and a tri(dimethylphenyl)phosphonium cation. Of these cations, the N,N-dialkylanilinium cations or the carbonium cations are preferred, and the N,N-dialkylanilinium cations are particularly preferred. Therefore, preferred examples of the ionic compound include a N,N-dimethylanilinium tetrakis(pentafluorophenyl)borate and a triphenylcarbonium tetrakis(pentafluorophenyl)borate. The content of the ionic compound including a boron anion and a cation may preferably be added by 0.1-fold mol to 10-fold mol, and more preferably by about 1-fold mol, with respect to the metallocene-based composite catalyst.

While it is required to use the above-described metallocene-based composite catalyst and the above-described boron anion in the above-described third polymerization catalyst composition, if a boron anion is present in the reaction system in which the metallocene catalyst represented by the formula (XVI) above is reacted with the organic aluminum compound, it is not possible to synthesize the metallocene-based composite catalyst of the formula (XV) above. Accordingly, preparation of the above-described third polymerization catalyst composition requires the metallocene-based composite catalyst to be synthesized in advance and isolated and purified before combined with a boron anion.

Preferred examples of the co-catalyst that can be contained in the third polymerization catalyst composition may include an organic aluminum compound represented by the $AlR^{K}R^{L}R^{M}$, and also include an aluminoxane. The aluminoxane is preferably an alkyl aluminoxane, examples of which include methyl aluminoxane (MAO) and modified methyl aluminoxane. In addition, preferred examples of the modified methyl aluminoxane include MMAO-3A (manufactured by Tosoh Finechem Corporation). These aluminoxanes may be contained alone or in combination of two or more.

In the method of manufacturing the copolymer, as described above, polymerization may be performed using a general coordinated ionic polymerization catalyst similarly to a conventional method of manufacturing a copolymer, except for the use of the above-described polymerization catalyst or polymerization catalyst composition. Here, the method of manufacturing the copolymer can be performed in, for example, either one of the following manners: (1) the components forming the polymerization catalyst composition may be separately provided in the polymerization system including, as monomers, a conjugated diene compound and a non-conjugated olefin other than the conjugated diene compound, to thereby produce the polymerization catalyst composition in the reaction system, or (2) the polymerization catalyst composition prepared in advance may be provided into the polymerization system. Further, the option (2) also includes providing the metallocene complex (active species) activated by the co-catalyst. The amount of the metallocene complex to be contained in the polymerization catalyst composition is preferably set to fall within a range of 0.0001-fold mol to 0.01-fold mol with respect to the total amount of the conjugate diene compound and the non-conjugated olefin other than the conjugate diene compound.

Further, in the method of manufacturing the copolymer, a terminator such as methanol, ethanol or isopropanol may be used to stop the polymerization.

In the method of manufacturing the copolymer, the polymerization reaction of the conjugated diene compound and the non-conjugated olefin may preferably be performed in an inert gas atmosphere, and preferably in nitrogen or argon atmosphere. The polymerization temperature of the polymerization reaction is not particularly limited, and preferably in a range of, for example, −100° C. to 200° C., and may also be set to temperatures around room temperature. An increase in polymerization temperature may reduce the cis-1,4-selectivity in the polymerization reaction. The polymerization reaction is preferably performed under pressure in a range of 0.1 MPa to 10.0 MPa so as to allow the conjugated diene compound and the non-conjugated olefin to be sufficiently introduced into the polymerization system. Further, the reaction time of the polymerization reaction is not particularly limited, and may preferably be in a range of, for example, 1 second to 10 days, which may be selected as appropriate depending on the conditions such as the type of monomers to be polymerized, type of catalyst and polymerization temperature.

In the aforementioned method of manufacturing the copolymer, when the conjugated diene compound is polymerized with the non-conjugated olefin other than the conjugated diene compound, the pressure of the non-conjugated olefin is preferably in the range of 0.1 MPa to 10 MPa. If the pressure of the non-conjugated olefin is 0.1 MPa or more, it is possible to efficiently introduce the non-conjugated olefin into the reaction mixture. In addition, if the pressure of the non-conjugated olefin is excessively high, the effect attained by efficient introduction of the non-conjugated olefin reaches a peak. Therefore, the pressure of the non-conjugated olefin is preferably 10 MPa or less.

According to the above-described method of manufacturing the copolymer, in polymerizing a conjugated diene compound and a non-conjugated olefin other than the conjugated diene compound, the concentration of the conjugated diene compound (mol/L) and the concentration of the non-conjugated olefin (mol/L) at the start of copolymerization preferably satisfy the following relation:
concentration of non-conjugated olefin/concentration of conjugated diene compound≥1.0;
further preferably satisfy the following relation:
concentration of non-conjugated olefin/concentration of conjugated diene compound≥1.3;
and still further preferably satisfy the following relation:
concentration of non-conjugated olefin/concentration of conjugated diene compound≥1.7.

The ratio of the concentration of the non-conjugated olefin to the concentration of the conjugated diene compound is defined to be at least 1, to thereby efficiently introduce the non-conjugated olefin into the reaction mixture.

In addition, even without using the above-described first polymerization catalyst composition, second polymerization catalyst composition, polymerization catalyst or third polymerization catalyst composition, i.e., even when a normal coordinated ionic polymerization catalyst is used, the above-described copolymer may be manufactured by adjusting the way monomers are fed into the polymerization system. Specifically, a second method of manufacturing the above-described copolymer has a feature in that charging of a conjugated diene compound is controlled in the presence of a non-conjugated olefin so as to organize the chain structure of the copolymer, to thereby control the arrangement of monomer units in the copolymer. As used herein, the term "polymerization system" refers to the location where a conjugated diene compound and a non-conjugated olefin are copolymerized, and specific examples thereof include a reaction container.

Here, charging of a conjugated diene compound may be performed by using either continuous charging or separate charging, and furthermore, a combination of both. As used herein, the continuous charging refers to, for example, adding a conjugated diene compound at a certain addition rate for a certain period.

Specifically, the concentration ratio of monomers in the polymerization system may be controlled by separate or continuous charging of a conjugated diene compound into a polymerization system for copolymerizing a conjugated diene compound and a non-conjugated olefin. This allows structural characterization of the chain structure (i.e., the arrangement of monomer units) in the resulting copolymer. Further, a conjugated diene compound may be charged into the polymerization system in the presence of a non-conjugated olefin, suppressing generation of homopolymer of the conjugated diene compound. The charging of the conjugated diene compound may be performed after the initiation of the polymerization of the non-conjugated olefin.

For example, if the above-described copolymer is manufactured by using the second method of manufacturing the copolymer according to the present invention, it is effective to continuously charge a conjugated diene compound in the presence of a non-conjugated olefin into the polymerization system in which polymerization of the non-conjugated olefin has been initiated in advance. It is particularly effective to repeat the following operation at least twice when a multi-block copolymer is manufactured by using the second method of manufacturing the copolymer: polymerize a non-conjugated olefin in the polymerization system; and then continuously charging a conjugated diene compound into the polymerization system in the presence of the non-conjugated olefin.

The aforementioned second manufacturing method is not particularly limited as long as the way of charging monomers into a polymerization system is specified as described above, and there may be employed an arbitrary polymerization method including, for example, solution polymerization, suspension polymerization, liquid phase bulk polymerization, emulsion polymerization, vapor phase polymerization, and solid state polymerization. Further, the aforementioned second manufacturing method may be performed in a similar manner to the first manufacturing method to copolymerize a conjugated diene compound and a non-conjugated olefin as monomers, except in that the way of charging monomers into the polymerization system is specified as described above.

In the aforementioned second manufacturing method, it is necessary to control the way of charging a conjugated diene compound; specifically, it is preferred to control how much and how many times a conjugated diene compound should be charged. Examples of the method of controlling the introduction of the conjugated diene compound may include, but not limited to: a controlling method based on a computer program or the like; and an analog control method with the use of a timer or the like. Further, as described above, the way of charging a conjugated diene compound is not particularly limited, including continuous charging and separate charging.

In the case of separate charging of a conjugated diene compound, as for the number of times to charge the conjugated diene compound, one to five times are preferred, although not particularly limited. If the conjugated diene compound is charged too many times, it may be difficult to distinguish a block copolymer from a random copolymer.

Further, the aforementioned second manufacturing method requires the presence of a non-conjugated olefin in the polymerization system at the time of charging a conjugated diene compound into the polymerization system. It is thus preferred to continuously feed a non-conjugated olefin to the polymerization system. In addition, the way of feeding a non-conjugated olefin is not particularly limited.

(Rubber Composition)

The rubber composition of the present invention is not particularly limited as long as the copolymer of the present invention is contained, and may be selected as appropriate depending on the application thereof. For example, the rubber composition preferably contains: a conjugated diene-based polymer; rubber components other than the copolymer and the conjugated diene-based polymer of the present invention; a reinforcing filler such as an inorganic filler and carbon black; a crosslinking agent; and other components.

<Copolymer>

The content of the copolymer of the present invention in the rubber components is not particularly limited, and may be selected as appropriate depending on the application thereof. The preferred content of the copolymer is at least 3 mass %.

The content of the copolymer in the rubber components less than 3 mass % may diminish the effect of the present invention or develop no effect at all.

<Conjugated Diene-Based Polymer>

As used herein, the conjugated diene-based polymer means a polymer that does not contain a non-conjugated olefin as a monomer unit component (as a part of the copolymer). It should be noted that the non-conjugated olefin does not include styrene.

The conjugated diene-based polymer is not particularly limited, and may be selected as appropriate depending on the application thereof. Examples thereof include natural rubber, various types of butadiene rubber, isoprene rubber, various types of styrene-butadiene copolymer rubber, styrene-isoprene copolymer rubber, styrene-isoprene-butadiene copolymer rubber, isoprene-butadiene copolymer rubber, acrylonitrile-butadiene rubber, chloroprene rubber, and so on. These rubber components may be used alone or in combination of two or more.

Among these, natural rubber is advantageous in good compatibility and better crack growth resistance.

<Mass Ratio>

Any number may be given as a mass ratio of the conjugated diene compound/non-conjugated olefin copolymer to the conjugated diene-based polymer appropriately depending on the intended use without limitation, preferably 10/90 to 90/10, and more preferably 25/75 to 75/25.

If the mass ratio of the conjugated diene compound/non-conjugated olefin copolymer to the conjugated diene-based polymer is more than 90/less than 10, fracture resistant properties and workability may be insufficient, while if the mass ratio is less than 10/more than 90, weather resistance may be insufficient. Mass ratios in a more preferred range are advantageous in terms of balancing performance requirements.

<Rubber Components>

The rubber components include the conjugated diene compound/non-conjugated olefin copolymer and the conjugated diene-based polymer, as well as other rubber components.

The other rubber components are not particularly limited, and may be selected as appropriate depending on the application thereof. Examples thereof include polysulfide rubber, silicone rubber, fluororubber, and urethane rubber. These rubber components may be used alone or in combination of two or more.

The content of the conjugated diene compound/non-conjugated olefin copolymer per 100 parts by mass of the rubber component is not particularly limited, and may be selected as appropriate depending on the application thereof. This content is preferably 10 parts by mass to 90 parts by mass, and more preferably 25 parts by mass to 75 parts by mass.

If the content of the conjugated diene compound/non-conjugated olefin copolymer per 100 parts by mass of the rubber component is less than 10 parts by mass, weather resistance may be reduced, while if the content is more than 90 parts by mass, fracture resistant properties and workability may be deteriorated.

In contrast, if the content of the conjugated diene compound/non-conjugated olefin copolymer per 100 parts by mass of the rubber component is in the above-described more preferred range, this is advantageous in terms of balancing performance requirements.

The content of the conjugated diene-based polymer per 100 parts by mass of the rubber component is not particularly limited, and may be selected as appropriate depending on the application thereof. This content is preferably 90 parts by mass to 10 parts by mass, and more preferably 75 parts by mass to 25 parts by mass.

If the content of the conjugated diene-based polymer per 100 parts by mass of the rubber component is less than 10 parts by mass, fracture resistant properties and workability may be deteriorated, while the content is more than 90 parts by mass, weather resistance may be reduced.

In contrast, if the content of the conjugated diene-based polymer per 100 parts by mass of the rubber component is in the above-described more preferred range, this is advantageous in terms of balancing performance requirements.

The rubber composition may be mixed with a reinforcing filler as necessary. Examples of the reinforcing filler include carbon black and inorganic fillers, and the reinforcing filler is preferably at least one selected from the carbon black and inorganic fillers. In this case, it is more preferable that the rubber composition includes carbon black.

The content of the reinforcing filler is not particularly limited, and may be selected as appropriate depending on the application thereof. The preferred content thereof is 5 parts by mass to 200 parts by mass per 100 parts by mass of the rubber component.

If the content of at least one of the above examples of the reinforcing filler is less than 5 parts by mass, there may not be much effect attained by adding the reinforcing filler, while the content is more than 200 parts by mass, mixture of the reinforcing filler into the rubber component tends to fail. In either case the resulting rubber composition may have lower performance.

<Carbon Black>

The carbon black is not particularly limited, and may be selected as appropriate depending on the application thereof. Examples thereof include FEF, GPF, SRF, HAF, N339, IISAF, ISAF, and SAF. These examples may be used alone or in combination of two or more.

The nitrogen adsorption specific surface area ($N_2SA$; according to JIS K6217-2:2001) of the carbon black is not particularly limited, and may be selected as appropriate depending on the application thereof. The carbon black preferably has a nitrogen adsorption specific surface area of more than 50 $m^2/g$, and more preferably 70 $m^2/g$ to 130 $m^2/g$.

If the carbon black has a nitrogen adsorption specific surface area ($N_2SA$) of not more than 50 $m^2/g$, the resulting rubber has a lower reinforcing effect, resulting in insufficient durability.

It should be noted that the nitrogen adsorption specific surface area ($N_2SA$) may be measured in accordance with, for example, JIS K6217-2:2001.

The content of the carbon black per 100 parts by mass of the rubber component is not particularly limited, and may be selected as appropriate depending on the application thereof. This content is preferably 10 parts by mass to 70 parts by mass, and more preferably 20 parts by mass to 60 parts by mass.

If the content of the carbon black is less than 10 parts by mass, the resulting rubber composition may have worse fracture resistant properties due to insufficient reinforcing performance, while the content is more than 70 parts by mass, the resulting rubber composition may have worse workability and low loss properties.

In contrast, the content of the carbon black is in the above-described more preferred range, this is advantageous in terms of balancing performance requirements.

<Inorganic Filler>

The inorganic filler is not particularly limited, and may be selected as appropriate depending on the application thereof. Examples thereof include silica, aluminum hydroxide, clay, alumina, talc, mica, kaolin, glass balloon, glass beads, calcium carbonate, magnesium carbonate, magnesium hydroxide, calcium carbonate, magnesium oxide, titanium oxide, potassium titanate, and barium sulfate. These examples may be used alone or in combination of two or more.

In using an inorganic filler, a silane coupling agent may also be used as appropriate.

<Crosslinking Agent>

The crosslinking agent is not particularly limited, and may be selected as appropriate depending on the application thereof. Examples thereof include a sulfur-based crosslinking agent, an organic peroxide-based crosslinking agent, an inorganic crosslinking agent, a polyamine crosslinking agent, a resin crosslinking agent, a sulfur compound-based crosslinking agent, oxime-nitrosamine-based crosslinking agent, and sulfur. Among these, preferred as a rubber composition for tires is the sulfur-based crosslinking agent.

The content of the crosslinking agent is not particularly limited, and may be selected as appropriate depending on the application thereof. The preferred content thereof is 0.1 parts by mass to 20 parts by mass per 100 parts by mass of the rubber component.

The crosslinking agent added by less than 0.1 parts by mass in content may hardly develop crosslinking, whereas the content exceeding 20 parts by mass tends to develop crosslinking by part of the crosslinking agent during the mixing, or to impair the physical property of the vulcanizate.

<Other Components>

Other than the above, a vulcanization accelerator may also be contained. Examples of compounds that can be used as the vulcanization accelerator include: guanidine-based compounds, aldehyde-amine-based compounds, aldehyde-ammonia-based compounds, thiazole-based compounds, sulfenamide-based compounds, thiourea-based compounds, thiuram-based compounds, dethiocarbamate-based compounds, and xanthate-based compounds.

Further, if necessary, any known agent such as a reinforcing agent, a softening agent, a filler, a co-agent, a colorant, a flame retardant, a lubricant, a foaming agent, a plasticizer, a processing aid, an antioxidant, an age resister, an anti-scorch agent, an ultraviolet rays protecting agent, an antistatic agent, a color protecting agent, and other compounding agents may be used depending on the intended use thereof.

(Crosslinked Rubber Composition)

The crosslinked rubber composition according to the present invention is not particularly limited as long as being obtained by crosslinking the rubber composition of the present invention, and may be selected as appropriate depending on the application thereof.

The conditions of the crosslinking are not particularly limited, and may be selected as appropriate depending on the application thereof. Conditions of temperature and heating time for the crosslinking may preferably be in the range of 120° C. to 200° C. for 1 minute to 900 minutes.

(Tire)

A tire of the present invention is not particularly limited as long as being manufactured by using the rubber composition of the present invention or the crosslinked rubber composition of the present invention, and may be selected as appropriate depending on the application thereof.

The rubber composition of the present invention or the crosslinked rubber composition of the present invention may be applied, for example, to a tread, a base tread, a sidewall, a side reinforcing rubber, and a bead filler of a tire, without being limited thereto.

Among these, it is more advantageous to apply the rubber composition to a tread in terms of wear resistance.

The tire can be manufactured by a conventional method. For example, a carcass layer, a belt layer, a tread layer, which are composed of unvulcanized rubber, and other members used for the production of usual tires are successively laminated on a tire molding drum, then the drum is withdrawn to obtain a green tire. Thereafter, the green tire is heated and vulcanized in accordance with an ordinary method, to thereby obtain a desired tire (e.g., a pneumatic tire).

(Applications Other than Tires)

The rubber composition of the present invention or the crosslinked rubber composition of the present invention may be used for other applications than tires, such as anti-vibration rubber, seismic isolation rubber, a belt (conveyor belt), a rubber crawler, various types of hoses, and moran.

EXAMPLES

In the following, the present invention will be described with reference to examples thereof. However, the present invention is no way limited to the disclosed examples.

Example 1

Toluene of 150 mL was added to a 2 L stainless reactor that had been sufficiently dried, and then ethylene was introduced thereto at 0.4 MPa. Meanwhile, in a glovebox under a nitrogen atmosphere, 14.5 μmol of bis(2-phenylindenyl) gadolinium bis(dimethylsilylamide) [(2-PhC$_9$H$_6$)$_2$GdN(SiHMe$_2$)$_2$], 14.1 μmol of triphenylcarbonium tetrakis(pentafluorophenyl)borate [Ph$_3$CB(C$_6$F$_5$)$_4$], and 0.87 mmol of diisobutylaluminum hydride were provided in a glass container, which was dissolved into 5 mL of toluene, to thereby obtain a catalyst solution. After that, the catalyst solution was taken out from the glovebox and added by 14.1 μmol of gadolinium equivalent to the monomer solution, which was then subjected to polymerization at 50° C. for 5 minutes. Thereafter, 20 mL of a toluene solution containing 3.05 g (0.056 mol) of 1,3-butadiene was added while reducing the introduction pressure of ethylene at a rate of 0.2 MPa/min, and then polymerization was further performed for another 15 minutes. Then, the following operation was repeated three times in total: reset the introduction pressure of ethylene to 0.8 MPa and perform polymerization for 5 minutes, then add 40 mL of a toluene solution containing 6.09 g (0.113 mol) of 1,3-butadiene while reducing the introduction pressure of ethylene at a rate of 0.2 MPa/min, and subsequently performing further polymerization for 30 minutes. After the polymerization, 1 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain Copolymer A. The yield of Copolymer A thus obtained was 20.00 g.

Example 2

An experiment was performed similarly to Example 1 except that ethylene was first introduced at a pressure of 0.8 MPa, to thereby obtain Copolymer B. The yield of Copolymer B thus obtained was 24.50 g.

Example 3

Toluene of 1 L was added to a 2 L stainless reactor that had been sufficiently dried, and then ethylene was introduced thereto at 0.8 MPa. Meanwhile, in a glovebox under a nitrogen atmosphere, 18.2 μmol of bis(2-phenylindenyl) gadolinium bis(dimethylsilylamide) [(2-PhC$_9$H$_6$)$_2$GdN(SiHMe$_2$)$_2$], 18.2 μmol of triphenylcarbonium tetrakis(pentafluorophenyl)borate [Ph$_3$CB(C$_6$F$_5$)$_4$], and 2.73 mmol of diisobutylaluminum hydride were provided in a glass container, which was dissolved into 20 mL of toluene, to thereby obtain a catalyst solution. After that, the catalyst solution was taken out from the glovebox and added by 16.5 μmol of gadolinium equivalent to the monomer solution, which was then subjected to polymerization at 40° C. for 1 minute. Thereafter, 350 mL of a toluene solution containing 72 g (1.33 mol) of 1,3-butadiene was added while reducing the introduction pressure of ethylene at a rate of 0.2 MPa/min, and then the introduction pressure of ethylene was increased to 1.5 MPa to perform polymerization for another 90 minutes. After the polymerization, 1 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain Copolymer C. The yield of Copolymer C thus obtained was 76.50 g.

Comparative Example 1

Butadiene rubber (BR01, manufactured by JSR) was prepared as a sample of a comparative example.

Comparative Example 2

As illustrated in Preparation 1 of JP 2000-86857 A (PTL 4), a toluene solution (manufactured by Tosoh Akzo Corporation) containing 26.0 g of toluene and 6.7 mmol of methylaluminoxane were provided in a sealed pressure tight glass ampoule having an inner capacity of 150 mL in a nitrogen atmosphere. A toluene solution containing 0.0067 mmol of 2-methoxycarbonyl methylcyclopentadienyl trichlorotitanium (MeO(CO)CH$_2$CpTiCl$_3$) (TiES) was added dropwise to the ampoule which was held at an aging temperature (25° C.) over an aging time (5 minutes). Thereafter, the temperature was reduced to –25° C., and a solution containing 2.0 g of butadiene and 6.0 g of toluene was added, which was then subjected to polymerization at this temperature for 30 minutes. Subsequently, ethylene was supplied into the container to give a pressure of 5 kgf/cm$^2$, and the reaction was carried out for about 1 hour. Thereafter, a small amount of an acidic methanol solution was added to stop the polymerization reaction, and then the polymerization solution was poured into a large amount of acidic methanol, so that a precipitated white solid was collected by filtration and dried to obtain Copolymer D.

Comparative Example 3

An experiment was performed similarly to Comparative Example 2 except that the temperature was brought to room temperature and a solution containing 2.0 g of butadiene and 6.0 g of toluene was added, which was then subjected to polymerization at the room temperature for 30 minutes, to thereby obtain Copolymer E.

Example 4

A toluene solution of 160 mL was added to a 400 mL pressure-resistant grass reactor that had been sufficiently dried, and then ethylene was introduced thereto at 0.8 MPa. Meanwhile, in a glovebox under a nitrogen atmosphere, 28.5 μmol of bis(2-phenylindenyl)gadolinium bis(dimethylsilylamide) [(2-PhC$_9$H$_6$)$_2$GdN(SiHMe$_2$)$_2$], 34.2 μmol of dimethylanilinium tetrakis(pentafluorophenyl)borate [Me$_2$NHPhB(C$_6$F$_5$)$_4$], and 1.43 mmol of diisobutylaluminum hydride were provided in a glass container, which was dissolved into 8 mL of toluene, to thereby obtain a catalyst solution. After that, the catalyst solution was taken out from the glovebox and added by 28.2 μmol of gadolinium equivalent to the monomer solution, which was then subjected to polymerization at room temperature for 5 minutes. Thereafter, 100 mL of a toluene solution containing 15.23 g (0.28 mol) of 1,3-butadiene was added while reducing the introduction pressure of ethylene at a rate of 0.2 MPa/min, and then polymerization was further performed for another 90 minutes. After the polymerization, 1 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain Copolymer F (a block copolymer). The yield of Copolymer F thus obtained was 12.50 g.

The copolymers A to F and butadiene rubber thus obtained were subjected to measurements and evaluation for the weight-average molecular weight (Mw), molecular weight distribution (Mw/Mn), 1,2-vinyl bond content, cis-1,4 bond content and content of ethylene-derived unit in the following way.

(1) Weight-Average Molecular Weight (Mw) and Molecular Weight Distribution (Mw/Mn)

A polystyrene equivalent weight-average molecular weight (Mw) and a molecular weight distribution (Mw/Mn) of each copolymer were obtained through gel permeation chromatography [GPC: HLC-8121GPC/HT (manufactured by Tosoh Corporation), column: two of $GMH_{HR}$-H(S)HT (manufactured by Tosoh Corporation), detector: differential refractometer (RI), measurement temperature: 140° C.], using monodisperse polystyrene as a reference.

(2) Microstructure (1,2-vinyl bond content, cis-1,4 bond content)

The microstructure (1,2-vinyl bond content) of the butadiene unit in the copolymer is determined from an integral ratio of 1,2-vinyl bond component (5.0 ppm to 5.1 ppm) to a butadiene bond component (5 ppm to 5.6 ppm) of the whole, based on $^1$H-NMR spectrum (100° C., d-tetrachloroethane standard: 6 ppm), and the microstructure (cis-1,4 bond content) of the butadiene unit in the copolymer is determined from an integral ratio of cis-1,4 bond component (26.5 ppm to 27.5 ppm) to a butadiene bond component (26.5 ppm to 27.5 ppm+31.5 ppm to 32.5 ppm) of the whole, based on $^{13}$C-NMR spectrum (100° C., d-tetrachloroethane standard: 73.8 ppm). The calculated values of the 1,2-vinyl bond content (%) and cis-1,4 bond content (%) are shown in Table 1.

(3) Content of Ethylene-Derived Unit

The content of the ethylene-derived unit in the copolymer (mol %) was determined from an integral ratio of an ethylene bond component (28.5 ppm to 30.0 ppm) of the whole to a butadiene bond component (26.5 ppm to 27.5 ppm+31.5 ppm to 32.5 ppm) of the whole, based on $^{13}$C-NMR spectrum (100° C., d-tetrachloroethane standard: 73.8 ppm). The content (mol %) of the ethylene-derived unit is shown in Table 1.

As Examples 1 to 4 and Comparative Examples 1 to 3, the rubber compositions formulated as shown in Table 2 were prepared, which were vulcanized at 160° C. for 20 minutes. The vulcanized rubber compositions thus obtained were subjected to measurements of heat resistance, crack growth resistance (constant strain) and ozone resistance (dynamic) according to the following method.

TABLE 2

|  | parts by mass |
| --- | --- |
| polymer | 100 |
| stearic acid | 2 |
| carbon black (FEF class) | 50 |
| age resistor *1 | 1 |
| zinc oxide | 3 |
| co-agent CZ-G *2 | 0.4 |
| co-agent DM-P *3 | 0.2 |
| sulfur | 1.4 |

*1: N-(1,3-dimethylbutyl)-N'-p-phenylenediamine (NOCRAC 6C), manufactured by OUCHI SHINKO CHEMICAL INDUSTRIAL CO., LTD.
*2: N-cyclohexyl-2-benzothiazolesulfenamide (NOCCELER CZ-G), manufactured by OUCHI SHINKO CHEMICAL INDUSTRIAL CO., LTD.
*3: dibenzothiazyl disulfide (NOCCELER DM-P), manufactured by OUCHI SHINKO CHEMICAL INDUSTRIAL CO., LTD.

It should be noted that the above carbon black (FEF class) has $N_2SA$ of 42 m$^2$/g.

<Heat Resistance>

Vulcanized samples were each caused to deteriorate in an oven of 100° C. for 48 hours. Then, each sample taken out from the oven was subjected to tension test according to JIS K 6251 at room temperature, to thereby obtain the elongation at break. Table 3 shows the result thereof as the retention of elongation (%), which are indexed with a score of 100 representing the elongation at break obtained by tension test performed for samples with no thermal degradation. The larger retention (%) shows more excellent heat resistance.

<Crack Growth Resistance (Constant Strain)>

A 0.5-mm crack was given at the central portion of each JIS No. 3 test specimen. Then, fatigue was repetitively applied to each sample at room temperature under a constant strain of 0% to 100%, and the number of times it took to rupture the sample by applying the repetitive fatigue was counted for each sample. The results thereof are shown as being indexed with a score of 100 representing Comparative Example 1. Larger index values represent better crack growth resistance. In Table 3, ">200" means that the sample was not ruptured despite the repetitive fatigue applied twice as many as those applied to Comparative Example 1.

TABLE 1

|  | Ex. 1 | Ex. 2 | Ex. 3 | Comp. Ex. 1 | Comp. Ex. 2 | Comp. Ex. 3 | Ex. 4 |
| --- | --- | --- | --- | --- | --- | --- | --- |
| Copolymer Type | A | B | C | Butadiene Rubber | D | E | F |
| Mw (×10$^3$) | 225 | 278 | 202 | 454 | 230 | 195 | 350 |
| Mw/Mn | 2.39 | 9.15 | 3.40 | 3.45 | 1.32 | 1.95 | 2.20 |
| cis-1,4 bond content (%) | 98 | 97 | 98 | 97 | 92 | 73 | 98 |
| 1,2-vinyl bond (adduct) content (%) | 1.5 | 1.2 | 0.8 | 1.8 | 6.0 | 9.8 | 1.2 |
| ethylene content (mol %) | 15 | 34 | 20 | 0 | 16 | 12 | 7 |

<Ozone Resistance>

Ozone resistance was measured according to JIS K 6259. Rectangular test specimens were exposed at 40° C. and ozone concentration of 50 pphm under 30% dynamic stretching. Then, the conditions of the samples after 24 hours were visually examined (for cracks). The results thereof are shown in Table 3.

TABLE 3

|  | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|
| Copolymer Type | A | B | C | Butadiene Rubber | D | E | F |
| Retention of Heat Resistance Eb (%) | 62 | 67 | 67 | 58 | 54 | 51 | 60 |
| Crack Growth Resistance (index) Constant Strain | >200 | >200 | >200 | 100 | 123 | 105 | >200 |
| Ozone Resistance (dynamic) | no crack | no crack | no crack | large cracks across sample | fine cracks at sample edge | fine cracks across sample | no crack |

Preparation Example 1

Preparation of Butadiene-Ethylene Copolymer (EBR1)

In this case, 2,000 g of a toluene solution containing 120 g (2.22 mol) of 1,3-butadiene was added to a 4 L stainless reactor that had been sufficiently dried, and then ethylene was introduced thereto at 1.72 MPa. Meanwhile, in a glovebox under a nitrogen atmosphere, 28.5 μmol of bis(2-phenylindenyl)gadolinium bis(dimethylsilylamide) [(2-PhC$_9$H$_6$)$_2$GdN(SiHMe$_2$)$_2$], 28.5 μmol of dimethylanilinium tetrakis(pentafluorophenyl)borate [Me$_2$NHPhB(C$_6$F$_5$)$_4$], and 2.00 mmol of diisobutylaluminum hydride were provided in a glass container, which was dissolved into 40 mL of toluene, to thereby obtain a catalyst solution. After that, the catalyst solution was taken out from the glovebox and added by 25.0 μmol of gadolinium equivalent to the monomer solution, which was then subjected to polymerization at 50° C. for 90 minutes. After the polymerization, 5 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain a polymer. The yield of the copolymer EBR1 thus obtained was 98 g.

Preparation Example 2

Preparation of Butadiene-Ethylene Copolymer (EBR2)

In this case, 2,000 g of a toluene solution containing 230 g (4.26 mol) of 1,3-butadiene was added to a 4 L stainless reactor that had been sufficiently dried, and then ethylene was introduced thereto at 1.72 MPa. Meanwhile, in a glovebox under a nitrogen atmosphere, 145 μmol of bis(2-phenylindenyl)gadolinium bis(dimethylsilylamide) [(2-PhC$_9$H$_6$)$_2$GdN(SiHMe$_2$)$_2$], 145 μmol of dimethylanilinium tetrakis(pentafluorophenyl)borate [Me$_2$NHPhB(C$_6$F$_5$)$_4$], and 2.9 mmol of diisobutylaluminum hydride were provided in a glass container, which was dissolved into 100 mL of toluene, to thereby obtain a catalyst solution. After that, the catalyst solution was taken out from the glovebox and added by 142 μmol of gadolinium equivalent to the monomer solution, which was then subjected to polymerization at 60° C. for 60 minutes. After the polymerization, 5 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain a polymer. The yield of the copolymer EBR2 thus obtained was 248 g.

Preparation Example 3

Preparation of Butadiene-Ethylene Copolymer (EBR3)

A toluene solution of 200 mL containing 9.36 g (0.173 mol) of 1,3-butadiene was added to a 400 mL pressure-resistant grass reactor that had been sufficiently dried, and then ethylene was introduced thereto at 0.6 MPa. Meanwhile, in a glovebox under a nitrogen atmosphere, 21.0 μmol of (2-MeC$_9$H$_6$)$_2$Sc(MeAlMe$_3$), 21.0 μmol of triphenylcarbonium tetrakis(pentafluorophenyl)borate (Ph$_3$CB(C$_6$F$_5$)$_4$), and 0.25 mmol of diisobutylaluminum were provided in a glass container, which was dissolved into 5 mL of toluene, to thereby obtain a catalyst solution. After that, the catalyst solution was taken out from the glovebox and added to the monomer solution, and subjected to polymerization at 25° C. for 50 minutes. After the polymerization, 1 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain a polymer. The yield of the copolymer EBR3 thus obtained was 9.30 g.

Preparation Example 4

Preparation of Ethylene-Propylene-Butadiene Copolymer (EPDM)

As indicated in Synthesis Example 1 of JP 2000-063639 A, 500 mL of toluene was placed into a glass autoclave having an inner capacity of 1 L that had been subjected to nitrogen substitution to a sufficient degree, and furthermore, the system was saturated in liquid and gas phases with a mixed gas of ethylene at 50 L/h, propylene at 150 L/h and butadiene 20 L/h. Then, a pre-mixed solution of 0.25 mmol of triisobutyl aluminum and 0.006 mmol of triphenylcarbonium tetrakis(pentafluorophenyl)borate was added thereto to initiate polymerization. After the polymerization at 50° C. for 30 minutes, a small amount of isobutanol was added to terminate the polymerization. The polymer solution thus obtained was added to 1.5 L of methanol containing a small amount of hydrochloric acid to precipitate a polymer. The polymer was washed with methanol and then dried under reduced pressure at 130° C. for 10 hours, and the result was 3.25 g of ethylene-propylene-butadiene copolymer (EPDM).

It was determined that the ethylene-propylene-butadiene copolymer (EPDM) thus obtained has [η] of 1.8 dL/g as measured in decalin at 135° C., ethylene content of 69.1 mol %, propylene content of 25.1 mol %, and butadiene-based constituent unit of 5.8 mol %. A glass transition temperature (Tg), which was measured as a measure of detail of constituent unit based on butadiene and cold resistance, was −52° C.

The ethylene-butadiene copolymers (EBR1 to EBR3) and the ethylene-propylene-butadiene copolymer (EPDM) prepared as described above, as well as a high cis-butadiene rubber (HCBR) obtained (available from JSR under the trade name of BR01) were measured and evaluated for their weight-average molecular weight (Mw), molecular weight distribution (Mw/Mn), content of ethylene-derived unit, 1,2-vinyl bond content and cis-1,4 bond content according to the above-described method, and also for their haze value in the following way. The results thereof are shown in Table 4.

Haze Value

Each copolymer (polymer) was mixed with polyisoprene and the mixture was pressed between PET films at 100° C. A haze meter (manufactured by Nippon Denshoku Industries Co., Ltd.) was used to measure transparency (haze value) of the obtained samples, and the measurements were used as indicator of compatibility. The results are shown in Table 4 as being indexed with a score of 100 representing the haze value of the high cis-butadiene rubber (HCBR).

TABLE 4

| | Copolymer (Polymer) Type | | | | |
|---|---|---|---|---|---|
| | EBR1 | EBR2 | EBR3 | EPDM | HCBR |
| Mw (×10³) | 358 | 449 | 363 | — | 590 |
| Mw/Mn | 2.5 | 4.4 | 2.4 | — | 3.64 |
| Ethylene Content (mol %) | 9 | 38 | 5 | 69.1 | — |
| 1,2-vinyl Bond Content (%) | 0.9 | 0.9 | 5.6 | 5.2 | 2.5 |
| cis-1,4 Bond Content (%) | 98.2 | 98.3 | 90.7 | <90 (less than 90%) | 96.3 |
| Haze Value (index) | 70 | 68 | 68 | 123 | 100 |

Examples 5 to 14 and Comparative Examples 4 to 8

As Examples 5 to 10 and Comparative Examples 4 to 7, the rubber compositions formulated as shown in Table 5 were prepared, which were vulcanized at 160° C. for 20 minutes. The vulcanized rubber compositions thus obtained were subjected to measurements of wear resistance (index) according to the following method.

As for Examples 11 to 14 and Comparative Example 8, the rubber compositions formulated as shown in Table 6 were prepared, which were vulcanized at 160° C. for 20 minutes. The vulcanized rubber compositions thus obtained were subjected to measurements of crack growth resistance (index) according to the following method.

It should be noted that the compounds shown in "Master Batch" in Tables 5 and 6 were added to prepare master batches, to which the compounds shown in "Final Batch" were then added to prepare final batches.

<Wear Resistance>

The amount of abrasion was measured using a Lambourn abrasion tester with a slip rate of 60% at room temperature, and the results are shown as being indexed with a score of 100 representing the inverse of each result of Comparative Example 7. Larger values represent better wear resistance.

<Crack Growth Resistance (Constant Strain)>

A 0.5-mm crack was given at the central portion of each JIS No. 3 test specimen. Then, fatigue was repetitively applied to each sample at room temperature under a constant strain of 0% to 100%, and the number of times it took to rupture the sample by applying the repetitive fatigue was counted for each sample. The results thereof are shown as being indexed with a score of 100 representing Comparative Example 8. Larger index values represent better crack growth resistance (constant strain).

TABLE 5

| Master Batch | copolymer (polymer) (part of rubber composition) | 50.0 parts by mass |
|---|---|---|
| | natural rubber (NR)*¹ (part of rubber composition) | 50.0 parts by mass |
| | carbon black*² | 50.0 parts by mass |
| | stearic acid | 2.0 parts by mass |
| | age resistor SUNTIGHT A*³ | 2.0 parts by mass |
| | age resistor 6C*⁴ | 1.0 parts by mass |
| Final Batch | zinc oxide | 2.5 parts by mass |
| | co-agent D-G*⁵ | 0.2 parts by mass |
| | co-agent DM-P*⁶ | 0.2 parts by mass |
| | co-agent NS-P*⁷ | 0.5 parts by mass |
| | sulfur | 1.3 parts by mass |

TABLE 6

| Master Batch | rubber component (polymer) | 100.0 parts by mass |
|---|---|---|
| | carbon black*² | 50.0 parts by mass |
| | stearic acid | 2.0 parts by mass |
| | age resistor SUNTIGHT A*³ | 2.0 parts by mass |
| | age resistor 6C*⁴ | 1.0 parts by mass |
| Final Batch | zinc oxide | 2.5 parts by mass |
| | co-agent D-G*⁵ | 0.2 parts by mass |
| | co-agent DM-P*⁶ | 0.2 parts by mass |
| | co-agent NS-P*⁷ | 0.5 parts by mass |
| | sulfur | 1.3 parts by mass |

Used as the compounds *1 to *7 in Tables 5 and 6 were:
*¹RSS #3
*²Carbon black with $N_2SA$ The respective measurements of nitrogen adsorption specific surface area ($N_2SA$) of the carbon black samples used are shown in Tables 7 to 9. It should be noted that the nitrogen adsorption specific surface area ($N_2SA$) was measured in accordance with JIS K6217-2: 2001.
*³"SUNTIGHT A," manufactured by Seiko-Chemical Co., Ltd.
*⁴N-(1,3-dimethylbutyl)-N'-p-phenylenediamine, (NOCRAC 6C), manufactured by OUCHI SHINKO CHEMICAL INDUSTRIAL CO., LTD.
*⁵1,3-diphenylguanidine, manufactured by OUCHI SHINKO CHEMICAL INDUSTRIAL CO., LTD.
*⁶dibenzothiazyl disulfide (NOCCELER DM-P), manufactured by OUCHI SHINKO CHEMICAL INDUSTRIAL CO., LTD.
*⁷N-tert-butyl-2-benzothiazolylsulfenamide, manufactured by OUCHI SHINKO CHEMICAL INDUSTRIAL CO., LTD.

TABLE 7

| | Ex. 5 | Ex. 6 | Ex. 7 | Ex. 8 | Ex. 9 | Ex. 10 |
|---|---|---|---|---|---|---|
| Copolymer (Polymer) | EBR1 | EBR2 | EBR1 | EBR2 | EBR1 | EBR2 |
| $N_2SA$ of Carbon Black (m²/g) | 53 | 53 | 78 | 78 | 42 | 42 |
| Wear Resistance (index) | 111 | 115 | 120 | 126 | 105 | 107 |

TABLE 8

| | Comp. Ex. 4 | Comp. Ex. 5 | Comp. Ex. 6 | Comp. Ex. 7 |
|---|---|---|---|---|
| Copolymer (Polymer) | EBR3 | EBR3 | EPDM | HCBR |
| $N_2SA$ of Carbon Black (m²/g) | 53 | 78 | 53 | 53 |
| Wear Resistance (index) | 97 | 99 | 85 | 100 |

TABLE 9

|  | Ex. 11 | Ex. 12 | Ex. 13 | Ex. 14 | Comp. Ex. 8 |
|---|---|---|---|---|---|
| Content of natural rubber (NR) per 100 parts by mass of rubber composition (parts by mass) | 70 | 50 | 10 | 40 | 50 |
| Content of butadiene rubber (BR01 by JSR) per 100 parts by mass of rubber composition (parts by mass) | 0 | 0 | 0 | 30 | 50 |
| Content of prepared EBR1 per 100 parts by mass of rubber composition (parts by mass) | 30 | 50 | 90 | 30 | 0 |
| $N_2SA$ of Carbon Black ($m^2/g$) | 78 | 78 | 78 | 78 | 78 |
| Crack Growth Resistance (index) | 176 | 239 | 251 | 166 | 100 |

It can be seen from Tables 7 to 9 that each rubber composition containing a conjugated diene compound/non-conjugated olefin copolymer, in which the cis-1,4 bond content of a unit derived from the conjugated diene compound is more than 92%, and a conjugated diene-based polymer may improve wear resistance and crack growth resistance in a balanced manner.

INDUSTRIAL APPLICABILITY

The rubber composition of the present invention can be used generally for elastomer products, in particular, tire tread members.

The invention claimed is:

1. A copolymer of a conjugated diene compound and a non-conjugated olefin, wherein
   the cis-1,4 bond content of a unit derived from the conjugated diene compound is more than 92%.

2. The copolymer of a conjugated diene compound and a non-conjugated olefin according to claim 1, wherein the content of a unit derived from the non-conjugated olefin is 50 mol % or less.

3. The copolymer according to claim 1, wherein the content of 1,2 adduct units (including 3,4 adduct units) of the conjugated diene compound in the unit derived from the conjugated diene compound is 5% or less.

4. The copolymer of a conjugated diene compound and a non-conjugated olefin according to claim 1, wherein the copolymer has a molecular weight distribution (Mw/Mn) of 10 or less.

5. The copolymer of a conjugated diene compound and a non-conjugated olefin according to claim 1, wherein the non-conjugated olefin is an acyclic olefin.

6. The copolymer of a conjugated diene compound and a non-conjugated olefin according to claim 1, wherein the non-conjugated olefin has 2 to 10 carbon atoms.

7. The copolymer of a conjugated diene compound and a non-conjugated olefin according to claim 5, wherein the non-conjugated olefin is at least one selected from the group consisting of ethylene, propylene, and 1-butene.

8. The copolymer of a conjugated diene compound and a non-conjugated olefin according to claim 7, wherein the non-conjugated olefin is ethylene.

9. The copolymer of a conjugated diene compound and a non-conjugated olefin according to claim 1, wherein the conjugated diene compound has 4 to 8 carbon atoms.

10. The copolymer of a conjugated diene compound and a non-conjugated olefin according to claim 9, wherein the conjugated diene compound is at least one selected from the group consisting of 1,3-butadiene and isoprene.

11. A rubber composition comprising the copolymer according to claim 1.

12. The rubber composition according to claim 11 further comprising a conjugated diene-based polymer.

13. The rubber composition according to claim 11 further comprising carbon black, wherein the carbon black has a nitrogen adsorption specific surface area ($N_2SA$) of more than 50 $m^2/g$.

14. The rubber composition according to claim 13, wherein the content of the carbon black is 10 parts by mass to 70 parts by mass per 100 parts by mass of the rubber component.

15. The rubber composition according to claim 12, wherein the conjugated diene-based polymer is natural rubber.

16. The rubber composition according to claim 15, wherein the content of the natural rubber per 100 parts by mass of the rubber component is at least 10 parts by mass.

17. The rubber composition according to claim 12, wherein a mass ratio of the copolymer of a conjugated diene compound and a non-conjugated olefin to the conjugated diene-based polymer is 10/90 to 90/10.

18. The rubber composition according to claim 11 further comprising a crosslinking agent by 0.1 parts by mass to 20 parts by mass per 100 parts by mass of the rubber component.

19. A rubber composition for tire treads using the rubber composition according to claim 11 for tire tread members.

20. A crosslinked rubber composition obtained by crosslinking the rubber composition according to claim 11.

21. A tire manufactured by using the rubber composition according to claim 11.

22. A tire using the rubber composition according to claim 11 for tire tread members.

* * * * *